(12) United States Patent
Suzuki et al.

(10) Patent No.: US 6,903,148 B2
(45) Date of Patent: Jun. 7, 2005

(54) RESIN COMPOSITION AND ITS PRODUCTION PROCESS AND USES

(75) Inventors: Katsuhiko Suzuki, Kanagawa (JP); Yasuaki Kai, Yokohama (JP); Koichi Handa, Kanagawa (JP); Masao Nakajima, Chiba (JP); Takashi Seino, Kanagawa (JP); Shinkichi Torii, Kanagawa (JP); Tomohiro Ito, Kanagawa (JP); Kenji Uesugi, Kanagawa (JP); Masatoshi Chikazawa, Tokyo (JP); Takashi Takei, Tokyo (JP); Shoichiro Yano, Ibaraki (JP); Takashi Sawaguchi, Yokohama (JP)

(73) Assignees: Nissan Motor Co., Ltd., Yokohama (JP); Tama-Tlo Corporation, Tokyo (JP)

(*) Notice: Subject to any disclaimer, the term of this patent is extended or adjusted under 35 U.S.C. 154(b) by 132 days.

(21) Appl. No.: 10/396,476

(22) Filed: Mar. 26, 2003

(65) Prior Publication Data
US 2003/0191222 A1 Oct. 9, 2003

(30) Foreign Application Priority Data

Mar. 29, 2002 (JP) ........................................ 2002-096070
Jul. 29, 2002 (JP) ........................................ 2002-220236

(51) Int. Cl.[7] ............................. C08K 3/18; C08K 9/06; C08L 101/02; C08L 33/00

(52) U.S. Cl. ..................... 523/216; 523/200; 523/210
(58) Field of Search .................................. 523/200, 210, 523/216

(56) References Cited

U.S. PATENT DOCUMENTS

| 5,075,351 A | * | 12/1991 | Joslyn et al. .............. 523/200 |
| 5,985,953 A | * | 11/1999 | Lightsey et al. ............ 523/212 |
| 6,140,393 A | * | 10/2000 | Bomal et al. ............... 523/213 |
| 6,512,035 B1 | * | 1/2003 | Hergenrother et al. ...... 524/262 |

FOREIGN PATENT DOCUMENTS

JP          11-343349 A          12/1999

OTHER PUBLICATIONS

"Organic–Inorganic Polymer Hybrids", Kikan Kagaku Sosetsu No. 42 (Organic–Inorganic Nanocomposite Materials), Chemical Society of Japan (1999).

* cited by examiner

*Primary Examiner*—Kelechi C. Egwim
(74) *Attorney, Agent, or Firm*—Foley & Lardner LLP

(57) ABSTRACT

A resin composition of the present invention comprises a polymer having functional groups and a metal oxide surface modified to form functional groups at a surface of the metal oxide and dispersed uniformly in the polymer. The functional groups of the polymer and the functional groups of the metal oxide are ionically bondable to the metal oxide and the polymer, respectively, so that the polymer and the metal oxide are bonded by ionic bonds to each other.

46 Claims, 12 Drawing Sheets

RESIN COMPOSITION AND ITS PRODUCTION PROCESS AND USES

BACKGROUND OF THE INVENTION

The present invention relates to a resin composition, particularly suited for use in automotive parts, and its production process and uses. The present invention in particular relates to a resin composition comprising a transparent resin and a metal oxide filler dispersed in the transparent resin to increase rigidity of the resin composition without sacrificing transparency and impact resistance, a process for producing the resin composition, molded parts and articles comprising the resin composition, and processes for producing the molded parts and articles.

Transparent resins including methacrylic, polycarbonate, styrene and epoxy resins have such optical applications as organic glass and plastic lenses that are superior in impact resistance, lightness in weight and moldability to inorganic glass. In particular, the methacrylic resin provides high light transmittance, low light scattering properties, high transparency and high weather resistance, thereby increasing in its usage.

By combining these transparent resins with other substances, various composite materials (such as organic-inorganic polymer hybrids) have been proposed to develop therein much more advanced properties than the resins alone. For example, Japanese Laid-Open Patent Publication No. 11-343349 discloses resinous window glass obtained by adding fine, spherical particles of hydrophobized silica in polymethyl methacrylate (PMMA), which shows good transparency and improved surface hardness. Kikan Kagaku Sosetsu No. 42 (Organic-Inorganic Nanocomposite Materials), "Organic-Inorganic Polymer Hybrids", edited by Chemical Society of Japan (1999) discloses an organic-inorganic polymer hybrid prepared by sol-gel process. The polymer hybrid prepared by sol-gel process has an islands-in-a-sea structure with a sea of sol-gel silica and islands portion of an organic polymer, and shows good transparency.

SUMMARY OF THE INVENTION

In the earlier technology, however, there are the following problems in the organic glass of any transparent resin and composite material thereof.

The organic glass is low in rigidity than the inorganic glass, and thus needs to increase in thickness to be used as an item of large size and some rigidity (e.g. a vehicle front window) contrary to the expectation of weight reduction.

A filler of glass fiber can be added as reinforcements for improvement in rigidity, but the thus-obtained composite glass material is too low in transparency to ensure visibility. A filler of laminar clay (on the order of nanometers) may be added in place of the glass fiber. The obtained glass material is however insufficient in transparency and becomes undesiredly colored. Further, the interfacial strength between the resin and the laminar clay is insufficient so that the glass material is lower in impact resistance without its rigidity being improved as expected.

The resinous window glass disclosed in Japanese Laid-Open Patent Publication No. 11-343349 has too low rigidity and too large a coefficient of thermal expansion to be in practical use, although it shows good transparency and improved surface hardness as described above.

The polymer hybrid disclosed in Kikan Kagaku Sosetsu No. 42, "Organic-Inorganic Polymer Hybrids", Chemical Society of Japan (1999) is low in flexibility and impact resistance. In addition, the sol-gel silica cannot be formed into e.g. a fibrous shape to produce a desired reinforcement effect, and cannot be surface treated with e.g. an amino-containing surface modifier efficiently due to the dispersion of the surface modifier into the sol-gel silica.

It is therefore an object of the present invention to provide a resin composition comprising a transparent resin and a metal oxide filler (such as silica) dispersed in the transparent resin to increase rigidity of the resin composition without sacrificing any of the other characteristics, notably transparency and impact resistance, and its production process and uses.

According to an aspect of the present invention, there is provided a resin composition, comprising: a polymer having functional groups; and a metal oxide surface modified to form functional groups at a surface of the metal oxide and dispersed uniformly in the polymer, the functional groups of the polymer and the functional groups of the metal oxide being ionically bondable to the metal oxide and the polymer, respectively, to bond the polymer and the metal oxide by ionic bonds to each other.

According to another aspect of the present invention, there is provided a process for producing a resin composition, comprising: preparing a solution of a monomer component, the monomer component including at least one unsaturated monomer that has a functional group; mixing a metal oxide into the solution before or during polymerization, the metal oxide having functional groups at a surface thereof, the functional group of said at least one unsaturated monomer and the functional groups of the metal oxide being ionically bondable to each other; and polymerizing the monomer component.

DESCRIPTION OF THE INVENTION

The present invention will be described in detail below.

Resin Composition

Figure 19A:
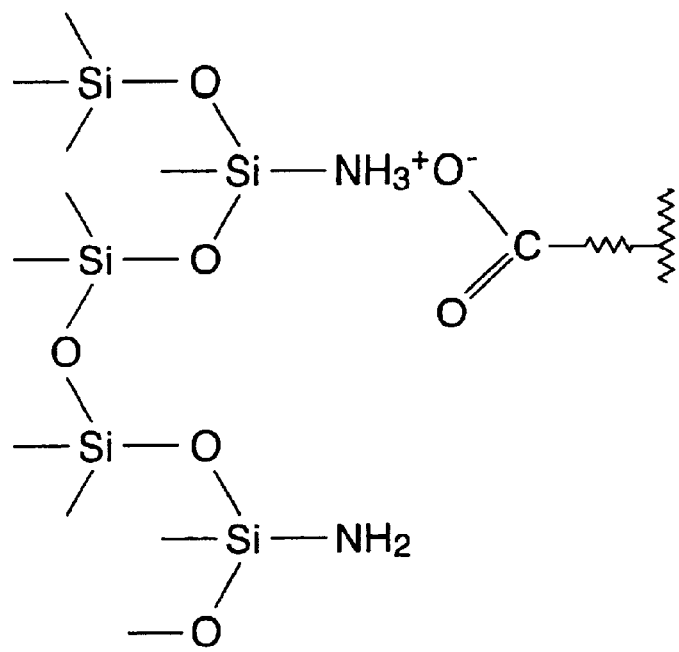
FIGS. 19A and 19B each show models for representing the interactions between polymers and metal oxides in resin compositions according to embodiments of the present invention.
Figure 19B:
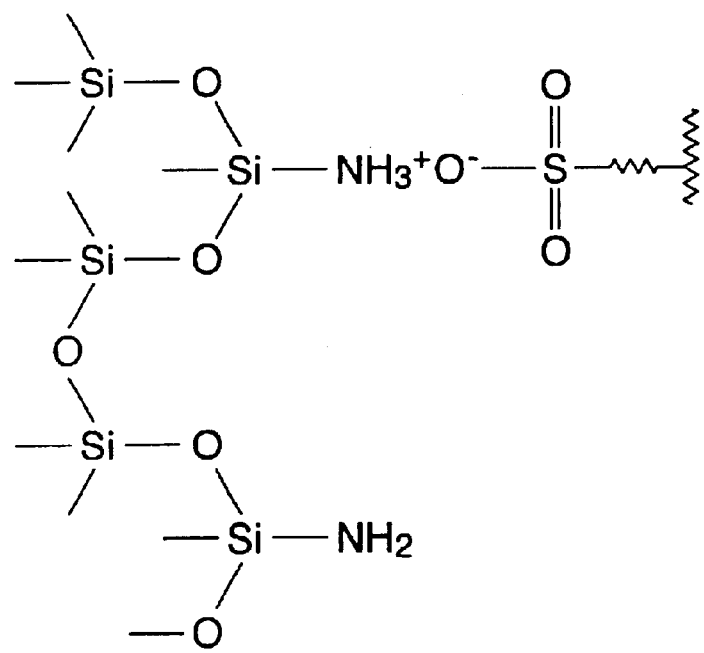

A resin composition of the present invention (hereinafter just referred to as a "resin composition") comprises a polymer having functional groups and a metal oxide (as a filler) surface modified to form functional groups at a surface of the metal oxide and dispersed uniformly in the polymer. The functional groups of the polymer and the functional groups of the metal oxide are ionically bondable to the metal oxide and the polymer, respectively, so that the polymer and the metal oxide are bonded to each other by ionic bonds. In other words, the resin composition has an islands-in-a-sea structure with a sea of the polymer and islands of the metal oxide being linked via the ionic bonds. Examples of the ionic bonds formed between the polymer and the metal oxide are shown in FIGS. 19A and 19B. The formation of such ionic bonds increases an interfacial interaction between the polymer and the metal oxide so that the thus-obtained resin composition increases in strength and rigidity without sacrificing transparency and impact resistance. Further, the resin composition of the above islands-in-a-sea structure shows higher flexibility and impact resistance than a conventional sol-gel organic-inorganic hybrid material.

The polymer used in the present invention is not particularly restricted, as long as the functional groups of the polymer are ionically bondable to the metal oxide. More specifically, the polymer can be either a homopolymer of an unsaturated monomer, a copolymer of unsaturated monomers or a copolymer of at least one unsaturated monomer and a monomer(s) copolymerizable therewith.

The unsaturated monomer used in the present invention has a functional group ionically bondable to the functional groups (preferably amino groups as will be described later) of the metal oxide. The functional group of the unsaturated monomer is not particularly restricted, and is preferably a carboxyl group (—COOH) or a sulfonic acid group (—SO$_2$OH) to be bonded more strongly by an ionic bond to the amino group of the metal oxide.

Specific examples of the unsaturated monomer having a carboxyl or sulfonic acid group include hydroxyethyl methacrylate, hydroxyethyl acrylate, hydroxypropyl methacrylate, hydroxypropyl acrylate, hydroxybutyl methacrylate, hydroxybutyl acrylate, methacrylamide, acrylamide, N-methylol methacrylamide, N-methylol acrylamide, diethylaminoethyl methacrylate, diethylaminoethyl acrylate, aminoethyl methacrylate, aminoethyl acrylate, glycidyl methacrylate, glycidyl acrylate, allylglycidylether, methyl vinyl ketone, methyl isopropenyl ketone, ethoxyethyl methacrylate, ethoxyethyl acrylate, methyl vinyl ether, ethyl vinyl ether, methacrylic acid, acrylic acid, styrenesulfonic acid, sulfopropyl methacrylate and sulfopropyl acrylate.

These unsaturated monomers can be used alone, or in the form of any combination of two or more thereof so as to provide the features of both the carboxyl and sulfonic acid groups.

The monomer copolymerizable with the unsaturated monomer is not particularly restricted, and is preferably a methacrylic monomer or an acrylic monomer. (Hereinafter, the terms "methacrylic monomer" and "acrylic monomer" are generically called a "(meth)acrylic monomer".)

The (meth)acrylic monomer used in the present invention is not particularly restricted. Specific examples of the (meth) acrylic monomer include methacrylic and acrylic esters, such as methyl methacrylate, methyl acrylate, ethyl methacrylate, ethyl acrylate, isopropyl methacrylate, isopropyl acrylate, n-butyl methacrylate, n-butyl acrylate, isobutyl methacrylate, isobutyl acrylate, n-amyl methacrylate, n-amyl acrylate, isoamyl methacrylate, isoamyl acrylate, n-hexyl methacrylate, n-hexyl acrylate, 2-ethylhexyl methacrylate, 2-ethylhexyl acrylate, octyl methacrylate, octyl acrylate, decyl methacrylate, decyl acrylate, dodecyl methacrylate, dodecyl acrylate, octadecyl methacrylate, octadecyl acrylate, cyclohexyl methacrylate, cyclohexyl acrylate, phenyl methacrylate, phenyl acrylate, benzyl methacrylate and benzyl acrylate.

These (meth)acrylic monomers can be used alone, or in the form of any combination of two or more thereof. In order to provide good balance between transparency, rigidity and hardness, it is preferable to use methyl methacrylate predominantly, desirably in an amount of 70% by mass based on a total mass of any other monomer(s) copolymerizable with the unsaturated monomer.

In the present invention, an acrylic copolymer derived from the above unsaturated and (meth)acrylic monomers is preferably used as the polymer. With the metal oxide being uniformly dispersed in the acrylic copolymer, it is possible to effectively provide higher rigidity and surface hardness and low thermal expansibility in the resin composition than those of an acrylic polymer alone, without a deterioration in transparency.

The acrylic copolymer preferably contains a predominant amount of acrylic resin moiety derived from the (meth) acrylic monomer(s). More specifically, the amount of the unsaturated monomer(s) is preferably 0.1 to 30% by mass, more preferably 1 to 10% by mass, based on a total mass of the acrylic copolymer. When the amount of the unsaturated monomer(s) is less than 0.1% by mass, there arises a possibility that the interfacial interaction between the acrylic copolymer and the metal oxide may not be increased considerably. When the amount of the unsaturated monomer(s) is more than 30% by mass, there arise a possibility that the resin composition may deteriorates in dimensional stability and durability due to large hygroscopicity of the acrylic copolymer.

The metal oxide used in the present invention is characterized as having at the surface thereof functional groups ionically bondable to the polymer. More specifically, the metal oxide has a part of its surface hydroxyl groups treated with a surface modifier to form the functional groups ionically bondable to the functional groups of the polymer, so that the metal oxide has both the hydroxyl groups and the functional groups ionically bondable to the functional groups of the polymer at the surface of the metal oxide. The functional groups of the metal oxide is preferably amino groups ($—NH_2$) and/or amino alkyl groups ($—R—NH_2$) to be strongly bonded by ionic bonds to the carboxyl and/or sulfonic acid groups of the polymer.

Specific examples of the metal oxide used in the present invention include silica (silicon oxide), titania (titanium oxide), alumina (aluminum oxide) and zirconia (zirconium oxide). Among these metal oxides, a silica compound, which has adequate transparency and low specific gravity and is easy to surface modify to increase the interfacial interaction with the polymer effectively, can be preferably used.

For example, the silica compound has hydroxyl groups at a surface thereof, which are known as silanol groups (—Si—OH). It is preferable that 15 to 50%, more preferably 20 to 45%, of the surface silanol groups of the silica compound has been modified using the surface modifier to form the functional groups ionically bondable to the functional groups of the polymer, with the proviso that the silica compound has all its surface silicon atoms bonded to the hydroxyl groups before surface modified. If the surface modification is not adequate, the silica compound cannot be contained in the resin composition in a sufficient amount to produce a desired reinforcement effect. The same goes for the other metal oxides.

The surface modifier used in the present invention is not particularly restricted. For adequate surface modification, an organic compound having both of a functional group ionically bondable to the functional groups (preferably carboxyl and/or sulfonic acid groups) of the polymer and a functional group chemically reactable with the surface hydroxyl groups of the metal oxide is preferably used as the surface modifier. The functional group ionically bondable to the carboxyl and/or sulfonic acid groups of the polymer is preferably an amino group ($—NH_2$) and/or an amino alkyl group ($—R—NH_2$), as described above. The functional group chemically reactable with the surface hydroxyl groups of the metal oxide is not particularly restricted. Specific examples of the functional group chemically reactable with the surface hydroxyl groups of the metal oxide include a chloro group, a methoxy group and an ethoxy group. These functional groups specifically have good reactivity to silanol groups, and can be used alone or in combination thereof.

As such a surface modifier, organosilicon compounds including aminoalkylalkoxysilanes and aminoalkylchlorosilanes can be used. Specific examples of the aminoalkylalkoxysilanes include N-2-(aminoethyl)-3-aminopropyltrimethoxysilane, N-2-(aminoethyl)-3-aminopropyldimethoxysilane and 3-aminopropyltriethoxysilane. Specific examples of the aminoalkylchlorosilanes include 3-aminopropyl- dimethylchlorosilane and 4-aminobutyldimethylchlorosialne. These organosilicon compounds can be used alone or in the form of a mixture of two or more thereof.

The method of surface modification is not particularly restricted, and the metal oxide can be surface modified by either liquid or vapor phase process regardless of the form of the metal oxide.

The metal oxide is in the form of primary particles and/or secondary particles, so that each metal oxide island in the polymer sea contains one or more particles. Herein, the term "primary particle" is defined as a "non-agglomerated, single fine particle", and the term "secondary particle" is defined as a "particle consisting essentially of a plurality of primary metal oxide particles agglomerated (i.e. chemically bonded) together in chain and/or network form". The primary and/or secondary particles of the metal oxide are not limited in shape, and can be not only of common or substantially spherical shape but also of cylindrical shape, rectangular parallelepiped shape, plate shape, linear shape (such as chain or fibrous shape), branched shape or network shape to provide transparency as well as improved strength, rigidity and elasticity.

The primary particles of the metal oxide preferably have an average size of 5 to 50 nm, although it is not an essential condition. For example, the primary metal oxide particles, in a cylindrical shape, may have a diameter of 5 to 10 nm and a length of 7 to 50 nm. The primary metal oxide particles of such a size are useful for forming the secondary metal oxide particles.

When the average size of the primary metal oxide particles is not within the above-specified range, there arise a possibility that the resin composition may not increase in strength and rigidity while maintaining high transparency and impact resistance.

The secondary particles of the metal oxide preferably have at the longest portions thereof a length of 380 nm (corresponding to the wavelength of visible light) or less, more preferably 5 to 200 nm, although it is not an essential condition. When the secondary metal oxide particles have a length exceeding 380 nm, the resin composition becomes low in transparency. When the secondary metal oxide particles have a length of less than 1 nm, there is a possibility that the metal oxide may not produce a desired reinforcement effect. Also, it may be industrially difficult to control the length of the metal oxide particle to less than 1 nm. For example, every 4 to 7 of the above cylindrical, primary metal oxide particles (5 to 10 nm in diameter and 7 to 50 nm in length) may be chemically bonded together in a longitudinal direction thereof to form chain- or network-shaped secondary particles.

Also, the secondary metal oxide particles preferably have a diameter-to-length ratio of 9 to 35 in order to provide improved strength, rigidity and elasticity in the resin composition.

With the above-mentioned secondary particles of the fine metal oxide particles that are smaller in length than the wavelength of visible light being dispersed uniformly in the transparent, amorphous polymer, it is possible to achieve further improvements in strength and rigidity for the resin composition without sacrificing any of high transparency and impact resistance.

Although the above-mentioned metal oxides (not only silica, but also titania, alumina and zirconia etc.) are formable into such secondary particles, fine silica particles can be most suitably used. The secondary silica particles are prepared by e.g. removing sodium from a raw material of sodium silicate ($Na_2O.SiO_2$: soluble glass) with ion-exchange treatment to obtain a seed sol (with a particle size of about 5 nm), growing secondary silica particles individually in chain form in the seed sol so that the secondary silica particles has a length of e.g. 10 to 100 nm, and then, concentrating the sol solution to yield a colloid of the secondary silica particles. In the process of particle growth, the secondary silica particles may grow in network form. The secondary silica particles that have not been surface modified are commercially available under the trade names of "Snowtex-UP" and "Snowtex OUP (prepared by removing sodium from "Snowtex-UP" with ion-exchange treatment) from Nissan Chemical Industries. Ltd.

The use of the above-mentioned metal oxide particles higher recyclability than a conventional resin reinforced with glass fiber. In the glass-fiber reinforced resin, glass fiber is broken under shearing stress so that the physical properties of the glass-fiber reinforced resin are gradually lowered. On the other hand, the metal oxide particles of the resin composition is unsusceptible to shearing stress, and there is little deterioration in the physical properties of the resin composition. It is thus possible to recycle the resin composition repeatedly.

Further, the metal oxide is preferably contained in the resin composition in an amount of 0.1 to 50% by mass, more preferably 1 to 35% by mass, based on a total mass of the resin composition. When the amount of the metal oxide is less than 0.1% by weight, there may be little improvement in strength and rigidity of the resin composition. When the amount of the metal oxide is more than 50% by weight, the resin composition may deteriorate in transparency and impact resistance and/or increase in specific gravity.

Above all, the acrylic copolymer and the silica compound are preferably used in combination. The functional groups of the acrylic copolymer and the silica compound are bonded to each other by ionic bonds more strongly to increase the interfacial interaction therebetween, whereby the resin composition can attain higher strength and rigidity without sacrificing transparency and impact resistance.

Production of Resin Composition

The resin composition can be produced by preparing a solution of a monomer component of the polymer, and mixing the metal oxide into the thus-prepared solution, and polymerizing the monomer component.

The solution of the monomer component is prepared by mixing the monomer component with or without the aid of a solvent. The monomer component includes at least one unsaturated monomer having a functional group ionically bondable to the metal oxide. The monomer component may further include a monomer, preferably a (meth)acrylic monomer, copolymerizable with the unsaturated monomer.

The metal oxide is, after surface modified, mixed with the prepared solution by adding the metal oxide directly into the solution, or dispersing the metal oxide uniformly in a dispersion medium and then adding the thus-obtained dispersion into the solution. Further, the metal oxide can be mixed with the solution of the monomer component before or in the process of polymerization.

The polymerization is initiated with the aid of a polymerization initiator. In the process of polymerization, ionic bonds occur between the functional groups of the unsaturated monomer and the metal oxide to increase the interfacial interaction between the polymer and the metal oxide. Thus, the polymer and the metal oxide are bonded more closely, and the thus-obtained resin composition benefits from a greater reinforcement effect. Further, the formation of such ionic bonds allows the metal oxide to be dispersed uniformly in the polymer.

The polymerization can be carried out by any common radical polymerization method, such as bulk, solution, suspension or emulsion polymerization, depending upon the usage of the resin composition, the production facilities available for the production of the resin composition and the like. Especially preferred is suspension or emulsion polymerization to mold the resin composition. Herein, there is a possibility that, if the surface modification is not adequate, the metal oxide may become dispersed in the solvent or dispersion medium in a greater amount during the polymerization so that the resin composition does not contain a sufficient amount of the metal oxide for improvement in rigidity. In the present invention, however, such a possibility can be avoided by using the surface-modified metal oxide e.g. silica, and any industrially desirable polymerization method can be selected.

The solvent and the dispersion medium used are selected depending upon the polymerization method used. Specific examples of the solvent and dispersion medium usable in the present invention include water, methyl ethyl ketone, toluene, methyl acetate, ethyl acetate or butyl acetate. The polymerization initiator used is also selected, as appropriate, from among the known substances. Specific examples of the polymerization inhibitor usable in the present invention include azobisisobutyronitrile and benzoyl peroxide. Further, a coagulant can be added after the polymerization so as to obtain the resin composition by sedimentation, and selected depending upon the polymerization method used. A specific example of the coagulant is hexane.

Uses of Resin Composition

The resin composition shows such features as high transparency and impact resistance, improved rigidity and low thermal expansibility to prevent warpage etc. at high temperature, and can be therefore applied to where the above features are necessitated in an automotive vehicle, a household electrical appliance and a residential building. Example uses of the resin composition will be described below.

According to a first embodiment of the present invention, there is provided interior and exterior parts and an outer panel of an automotive vehicle, comprising the resin composition. These interior and exterior parts and outer panel advantageously benefit from the properties of the resin composition, such as high transparency, rigidity, impact resistance and heat resistance and dimensional stability after heating/molding.

Figure 1:
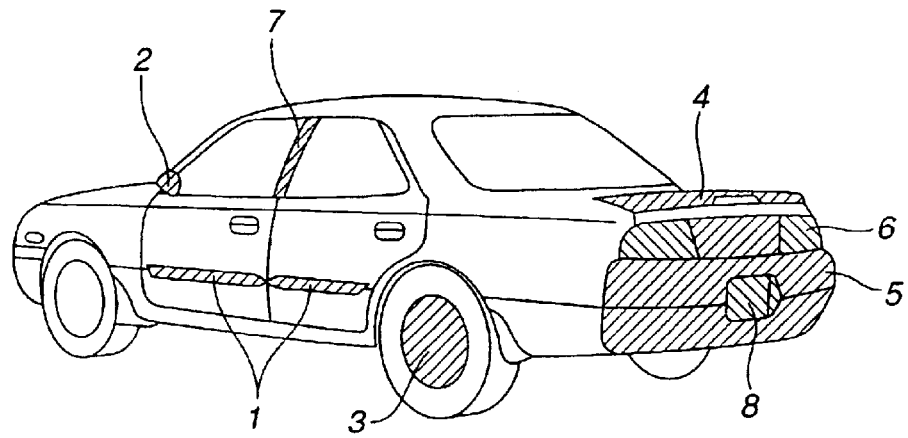
FIG. 1 is a schematic perspective view of an automotive vehicle of which exterior parts are produced from a resin composition according to the present invention.
Figure 2A:
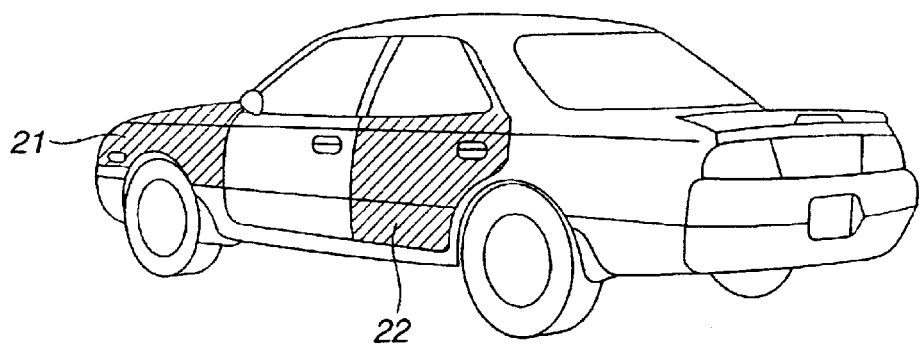
FIG. 2A is a schematic perspective view of an automotive vehicle of which outer panels are produced from a resin composition according to the present invention.
Figure 2B:
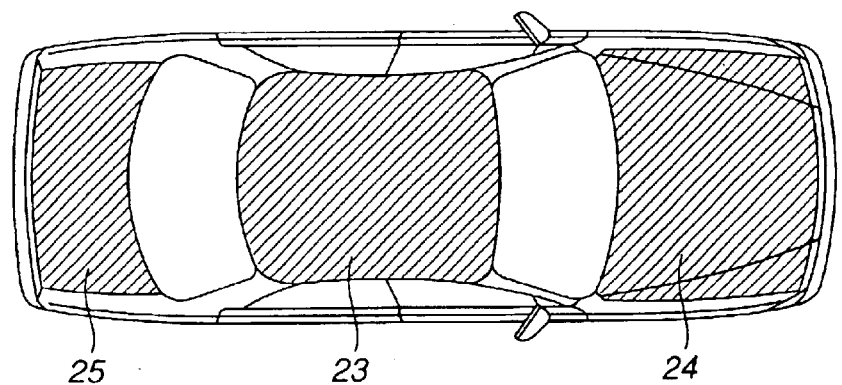
FIG. 2B is a schematic plan view of the automotive vehicle of FIG. 2A.

Examples of the vehicle exterior parts formed from the resin composition include door moldings 1, frames 2 for door mirrors, wheel caps 3, spoiler 4, bumpers 5, winker lenses 6, pillar garnishes 7, rear finisher 8 and headlamp covers (not shown) as shown in FIG. 1. As shown in FIGS. 2A and 2B, examples of the vehicle outer panels formed from the resin composition include front fenders 21, door panels 22, roof panel 23, hood panel 24, trunk lid 25 and back door panels (not shown).

According to a second embodiment of the present invention, there are provided a resinous wiper system, a resinous door mirror stay and a resinous pillar, comprising the resin composition. These resinous wiper system, door mirror stay and pillar advantageously benefit from the properties of the resin composition, such as high transparency as well as rigidity, rigidity, impact resistance, heat resistance, dimensional stability after heating/molding, to provide improved visibility for a vehicle driver.

A conventional wiper system has been made of a black-finished steel material and a black rubber, thereby impairing visibility when working at a low speed. A conventional door mirror stay has been made of a resin having a finish coating in the same color with the outer plate or in a black color, thereby impairing visibility during a right or left turn of the vehicle. Further, conventional front, center and rear pillars has been made of a steel material, so that the front and center pillars impair visibility in a normal driving or during a right or left turn of the vehicle whereas the rear pillars impair visibility in a reverse driving of the vehicle or at the time that the driver ensures safety behind the vehicle. Although the use of a transparent resinous material provides improved visibility in these parts, any conventional transparent resinous material does not satisfy the requirements of high rigidity, heat resistance and dimensional stability after heating/molding as well as transparency. However, the resin composition can provide high transparency, high rigidity, low thermal expansibility and low molding contractibility without the above-mentioned problems, so that the transparent wiper system, door mirror stay and pillars produced using the resin composition increase in visibility and in desinability.

Figure 3:
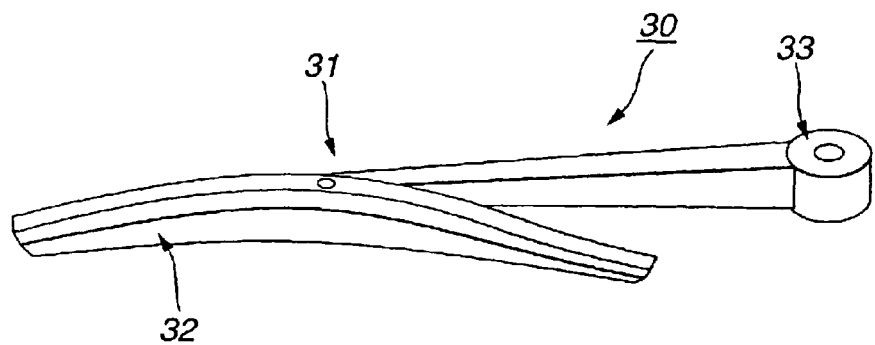
FIG. 3 is a schematic perspective view of a wiper system for an automotive vehicle, which is produced using a resin composition according to the present invention.

An example of the resinous wiper system produced using the resin composition is shown in FIG. 3. Wiper system 30 has wiper arm 31 and wiper blade 32, and moves along a half arc about nut hole 33 for securing wiper arm 31 to a vehicle body (not shown). Wiper blade 32 usually includes an elastic supporting portion and a soft rubber portion. At least one of wiper arm 31 and the supporting portion of wiper blade 32 is produced using the resin composition. In wiper system 30, it is preferable to use e.g. a silicone rubber having high durability and relatively high transparency for the rubber portion of wiper blade 32. The wiper blade supporting portion of wiper blade 32 may be formed of a composite material prepared by adding an adequate amount of acrylic rubber into the resin composition, so as to provide moderate elasticity for the wiper blade supporting portion. More specifically, such a composite material can be prepared by, for example, adding 1 to 30 parts by weight of a acrylic rubber component (such as ethyl acrylate, butyl acrylate and/or a copolymer thereof, e.g. "Nipol AR31" available from Nippon Zeon Co., Ltd.) to 100 parts by weight of the resin composition.

The resinous door mirror stay and pillars can be produced using as a transparent material the resin composition only, or a multi-layer laminate comprising the resin composition and another resin. The multi-layer laminate has at least one layer, preferably its outermost and lowermost layers, more preferably one or more middle layers, too, formed from the resin composition, so as to develop additional features other than those given by the resin composition. The thickness of each individual layer in the laminate may be selected depending on the thickness of the door mirror stay or pillar and the number of layers in the laminate. A polyester, polycarbonate resin may be used in combination with the resin composition to form such a multi-layer laminate. There is no particular limitation on the manufacturing processes and structures of the resinous door mirror stay and pillars. The resinous door mirror stay and pillars may be formed individually, or integrally molded with a roof panel as will be described later.

According to a third embodiment of the present invention, there is provided a molded article having a transparent portion and an opaque portion, in which at least the transparent portion comprises the resin composition. Such a molded article advantageously benefit from the properties of the resin composition, such as high rigidity, heat resistance, dimensional stability after heating/molding, chemical resistance, transparency and impact resistance to be used as e.g. automotive parts. More specifically, an automotive vehicle contains transparent parts (such as lamps, covers and windows) and opaque parts (such as outer panels and interior parts). It has been difficult to mold an integral combination of these transparent and opaque parts from any conventional resinous material, because the transparent and opaque parts require different characteristics including transparency, rigidity, heat resistance, low linear expansibility, low molding contractibility and chemical resistance. However, the use of the resin composition allows the molded part to have its transparent and opaque portions molded into one piece while ensuring high rigidity, high heat resistance, low linear expansibility, low molding contractibility and high chemical resistance of the resin composition. This makes it possible to reduce the number and weight of parts in the vehicle and the number of steps in vehicle assembling process and to combine conventionally divided part contour lines into a single continuous line for improvement in outward appearance.

Figure 4:
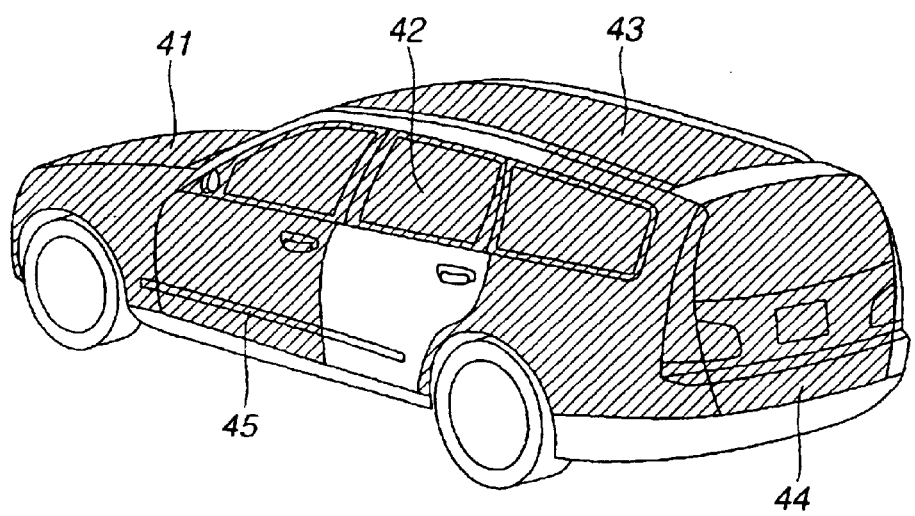
FIG. 4 is a schematic perspective view of an automotive vehicle of which exterior parts are produced using a resin composition according to the present invention.
Figure 5:
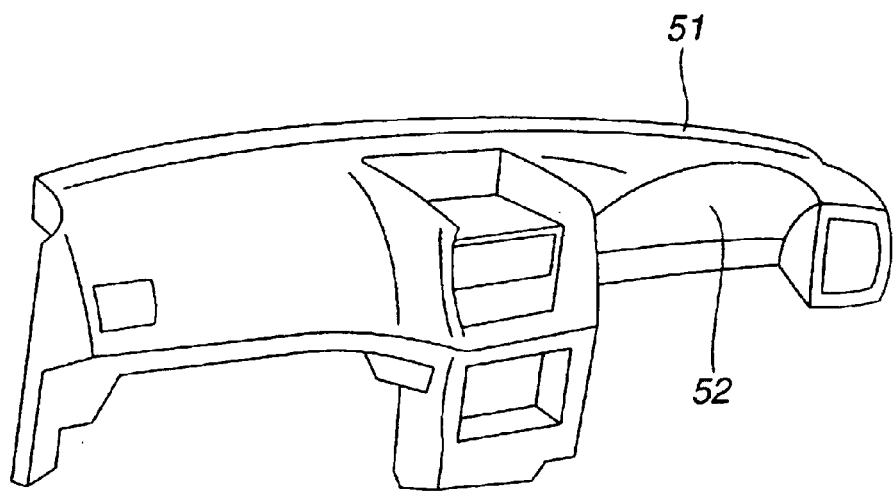
FIG. 5 is a schematic perspective view of an instrument panel for an automotive vehicle, which is produced using a resin composition according to the present invention.

Example uses of the molded article produced using the resin composition are as interior and exterior parts, such as a combination lamp-hood-fender system 41, a combination pillar garnish-rear quarter glass system 42, a combination roof fender-window glass system 43, a combination back door-window glass system 44 and a combination door-window glass system 45, and an instrument panel, as shown in FIGS. 4 and 5.

Automotive headlamps (not shown) require transparency while surrounded by other separate opaque parts, such as a bumper, a front grill, a fender and a hood. In system 41, these transparent and opaque parts are formed integrally with each other in such a manner that at least the transparent parts comprise the resin composition. This makes it possible to reduce the number of parts in the vehicle and thereby possible to reduce the number of steps in vehicle assembling process. Further, there is no fear of the resinous parts being melted by a nearby source of heat in a lamp in system 41, because of high heat resistance of the resin composition. Although a conventional headlamp has been formed from a low-light-resistant polycarbonate resin and thus needed surface coating to prevent from becoming discolored yellow by exposure to sunlight, the headlamp of system 41 is free from such a problem because of high light resistance of the resin composition.

Automotive window glasses, which require transparency, include side- and back-door glasses attached to side and back doors, respectively, rear quarter glasses attached to rear fenders and a roof and a rear window glass. In systems 42 to 45, the transparent window glass is integrally formed with its attachment in such a manner that at least the window glasses comprise the resin composition. For example, each of the side- and back-door glasses is disposed between inner and outer door panels. The window glass of each system 44 and 45 is formed integrally with the inner and outer door panels by molding the resin composition into a hollow structure, or defining a hollow structure with the inner and outer door panels and then pouring the resin composition thereinto. A door lock mechanism and a wiper motor may be provided into such a hollow structure in a subsequent process step. The rear quarter glass of system 42 is formed integrally with the pillar garnish in a similar manner. Thus, the rear quarter glass can be mounted on the vehicle simultaneously with the installation of interior parts. This makes it possible to reduce the number of steps in vehicle assembling process.

As shown in FIG. 5, the instrument panel has opaque panel body 51 and transparent instrument cover 52 formed integrally with each other in such a manner that at least transparent instrument cover 52 comprises the resin composition. This also makes it possible to reduce the number and weight of parts in the vehicle.

The molded article produced using the resin composition can be used as any other combination of parts as well as a partly-transparent structural part of high strength and rigidity. For example, a sunroof can be produced by forming at least a transparent roof portion from the resin composition without providing a glass skylight portion.

In the above-mentioned molded article, the opaque portion can be colored by using a colored resin as a raw material, painting or printing, or using a colored resinous sheet.

In the case of using a colored resin as a raw material for the opaque portion, the colored resin is prepared by e.g. dispersing a pigment in a raw resin or by kneading a molten mixture of resin and pigment pellets. Then, the molded article is formed with both the transparent and colored opaque portions, by injecting the colored resin into a mold in an injection molding machine, opening the mold or forming a new molten resin passage, and then, injecting the molten transparent resin composition into a cavity of the mold with the use of a separate cylinder. The transparent resin composition may be first injected, followed by injecting the colored opaque resin.

In the case of painting or printing a color on the opaque portion, the molten transparent resin composition is firstly formed into the molded article. Then, the molded article is given painting or printing from its front or rear side to be finished in any opaque color. Alternatively, the painting or printing may be given before shaping the molten resin composition.

In the case of using a colored resinous sheet for the opaque portion, the colored, opaque resinous sheet is preliminarily shaped and placed in a mold. Then, the molten transparent resin composition is injected into the mold. The molded article is obtained by cooling and solidifying the content of the mold and removing it from the mold.

Further, the above-mentioned molded article can be produced using the resin composition (with or without a pigment) alone, or a multi-layer laminate comprising the resin composition and another resin. The multi-layer laminate has at least one layer, preferably its outermost and lowermost layers, more preferably one or more middle layers, too, formed of the resin composition, so as to develop additional features other than those given by the resin composition of the present invention. The kind of another resin and the thickness of each individual layer in the laminate may be selected depending on the use of the molded article.

According to a fourth embodiment of the present invention, there are provided a resinous window (preferably a resinous window with a heating element or wire), a resinous mirror, a resinous lamp reflector, a resinous cover or case for use in an engine compartment and a resinous part of a cooling system, comprising the resin composition. These resinous window, mirror, lamp reflector, cover or case and part advantageously benefit from the properties of the resin composition, such as high rigidity, heat resistance, dimensional stability after heating/molding, chemical resistance and transparency, to prevent fogging and provide improved visibility for a vehicle driver. The use of such resinous window, mirror, lamp reflector, cover or case and part enables reductions in the number and weight of parts in a vehicle and the number of steps in vehicle assembling process.

Figure 6:
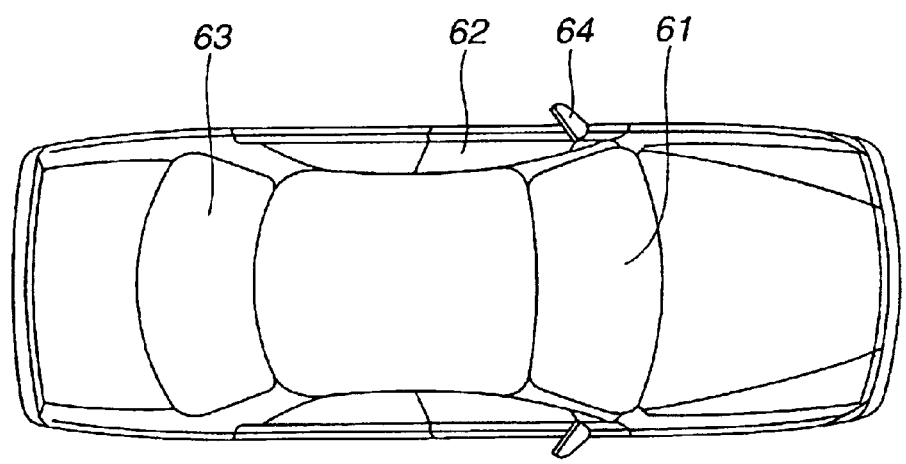
FIG. 6 is a schematic plan view of an automotive vehicle of which resinous mirrors and resinous windows are produced from a resin composition according to the present invention.

As shown in FIG. 6, examples of the resinous windows formed from the resin composition include front window 61, door windows 62 and rear window 63 of a vehicle, which often include heating elements or wires inside or on surfaces thereof so as to prevent defogging. Windows 61 to 63 are disposed in front, right, left and rear sides of a vehicle to defy wind and rain, and require a relatively large effective area of 3 to 4 $m^2$ in total. Although conventional front, door and rear windows of inorganic glass have been weighed 30 to 35 kg, these relatively large windows 61 to 63 can be reduced in weight. Further, windows 61 to 63 are free from the problems of heat resistance and thermal expansion even when the heating elements or wires thereof are heated. Herein, the method for forming a heating element or wire in the resinous window is not particularly limited. For example, the heating element or wire may be formed by the insert molding of a film-form heating material into the window, or by the vapor deposition, coating or printing of a heating material on the inner surface of the window.

An example of the resinous mirror formed from the resin composition, side mirror 64, is shown in FIG. 6. Side mirror 64 can be also made lighter in weight than that made of any conventional glass or transparent resin, and equipped with a heating element or wire to avoid defogging. A room mirror can be formed from the resin composition although not shown in the drawings.

As described above, the resin composition can provide high rigidity and low thermal expansibility without deteriorations in transparency and impact resistance, so that the resinous window and mirror formed from the resin composition can satisfy the requirement of safety and functionality to be put to practical use. This makes it possible to reduce vehicle weight and to increase vehicle design flexibility. In recent years, a one-box type RV (recreational vehicle) with a large window portion has become widely used, and there arise a growing need for the resinous window to achieve weight reduction in such a RV and to assure passenger visibility and comfort. The resinous window formed from the resin composition can adequately contribute to vehicle weight reduction and improvement in passenger visibility and comfort.

The resinous window and mirror formed from the resin composition may find other applications that require high rigidity, damage resistance as well as appearance qualities (e.g. visual beauty, smoothness and transparency), such as exterior and interior components for a building and interior parts for a rail car, without being limited to the above.

Figure 7:
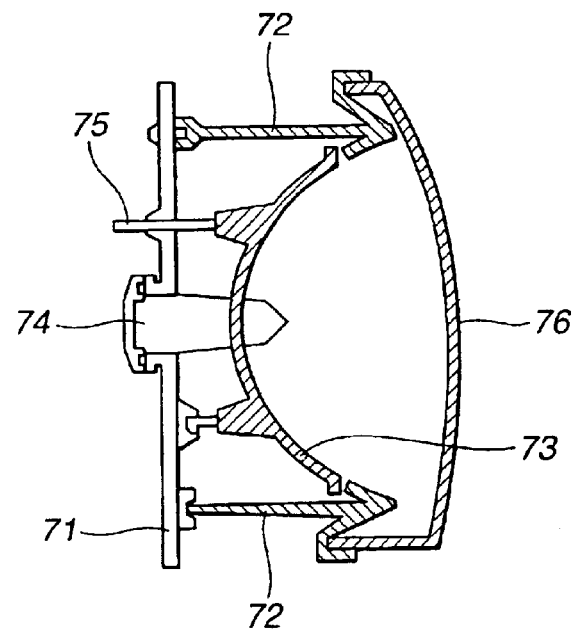
FIG. 7 is a schematic cross-sectional view of a headlamp for an automotive vehicle, in which a resinous lamp reflector is produced from a resin composition according to the present invention.

An example of the resinous lamp reflector formed from the resin composition is shown in FIG. 7. Reflector 73 is mounted in outer member 72. Outer member 72 is secured to base 71 on the vehicle body, and outer lens 76 is fitted on outer member 72. Bulb 74 and optical axis regulator 75 are connected to reflector 73. Although a reflector formed from any conventional resinous material has often deteriorated in heat resistance, linear expansibility and linear expansion anisotropy, reflector 73 formed from the resin composition becomes free from such problems. Further, the resin composition has high rigidity so that lamp reflector 73 can be light in weight and high in heat resistance, dimensional stability and surface smoothness. Lamp reflector 73 can be therefore suitably used as a reflector for a headlamp, a fog lamp or a rear combination lamp, or a sub-reflector for a headlamp. Herein, a reflecting portion of the reflector may be formed by, for example, the insert molding of a reflecting film during manufacturing the reflecting portion, or the vapor deposition of a reflecting film after injection or press molding the reflecting portion.

Figure 8:
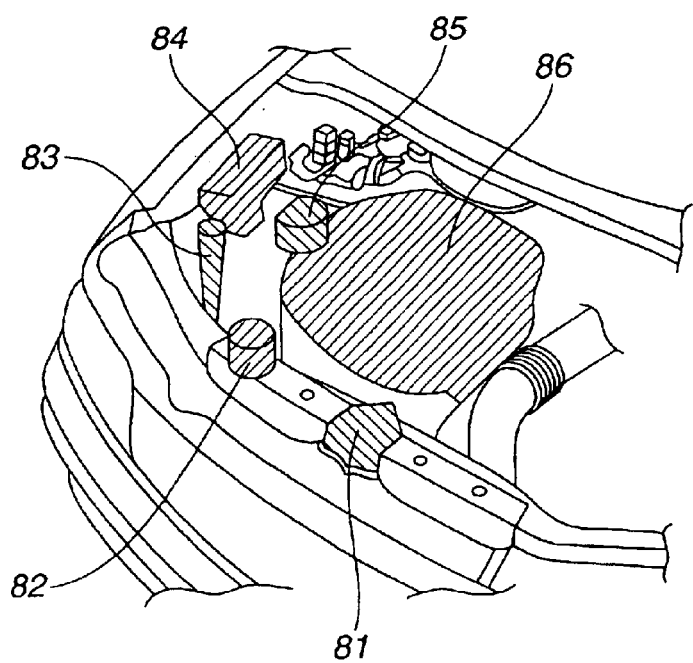
FIG. 8 is an internal view of an engine compartment of an automotive vehicle, which has parts produced from a resin composition according the present invention.
Figure 9:
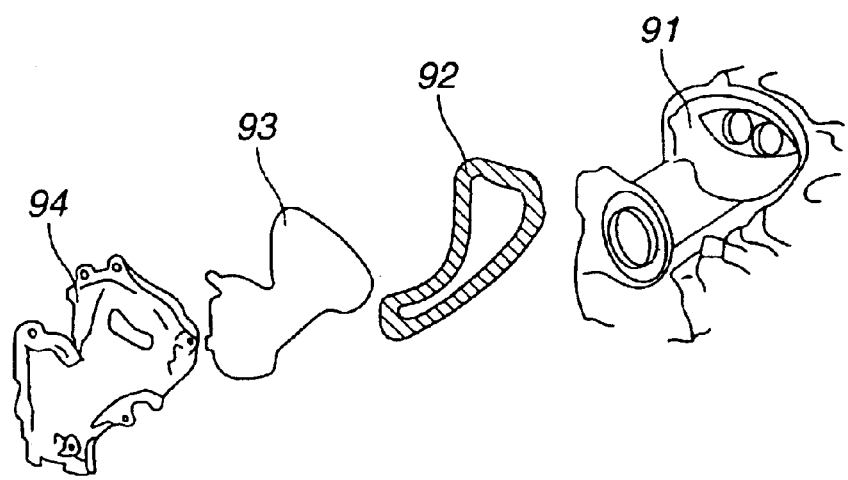
FIG. 9 a schematic exploded perspective view of parts for an engine compartment, which are produced from a resin composition according to the present invention.

Examples of the resinous cover or case formed from the resin composition for use in the engine compartment include radiator 81, coolant reservoir tank 82, washer tank inlet 83, housing 84 for electrical parts, brake oil tank 85, cylinder head cover 86, engine body 91, timing chain 92, gasket 93 and front chain case 94, as shown in FIGS. 8 and 9. The resin composition has high transparency, heat resistance, chemical resistance and rigidity, so that these parts 81 to 86 and 91 to 94 formed from the resin composition can withstand severe temperature conditions in the engine compartment. Further, the resin composition has good transparency to provide improved visibility of the insides of e.g. washer tank inlet 83, housing 84 for electrical parts, brake oil tank 85, cylinder head cover 86 and timing belt cover.

Figure 10:
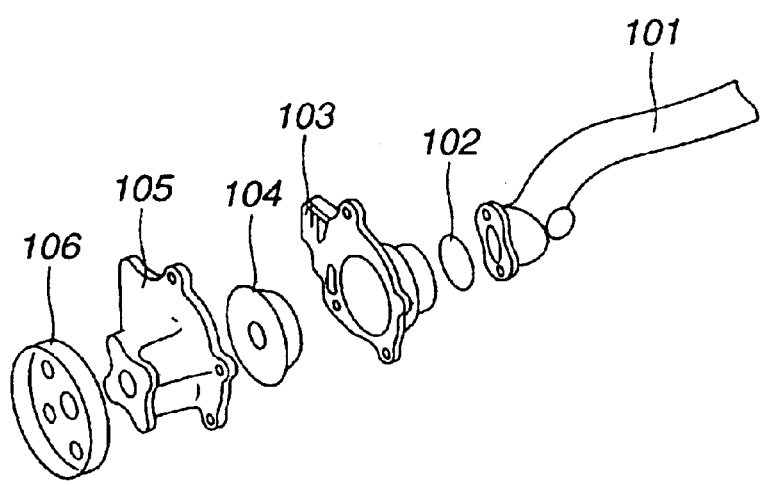
FIG. 10 is a schematic exploded perspective view of parts for a cooling system, which are produced from a resin composition according the present invention.
Figure 11:
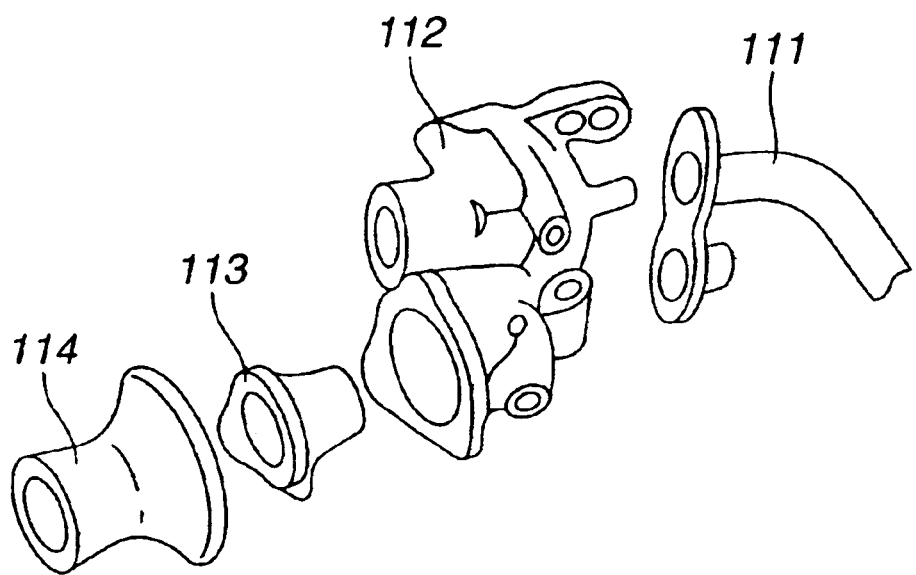
FIG. 11 is a schematic exploded perspective view showing parts in a cooling system, which are produced from a resin composition according to the present invention.

Examples of the resinous part formed from the resin composition for use in the cooling system include parts for the top and base of a radiator tank and valves, such as water pipe 101, O-ring 102, water pump housing 103, water pump impeller 104, water pump 105 and water pump pulley 106, water pipe 111, thermostat housing 112, thermostat 113 and water inlet 114, as shown in FIGS. 10 and 11. The use of the resin composition allows these parts 101 to 106 and 111 to 114 to have high heat resistance, chemical resistance and strength/rigidity and be light weighted, so that parts 101 to 106 and 111 to 114 can be suitably used in an engine compartment in such a manner as to be brought into contact with coolant. Further, these parts 101 to 106 and 111 to 114 can contribute to weight reduction, improved chemical resistance and fuel consumption, thereby having great value in practical use.

Although the above-mentioned resinous window, resinous mirror, resinous lamp reflector, resinous cover or case and resinous part can be formed from the resin composition alone, they may also be formed of a multi-layer laminate comprising the resin composition and another resin. The multi-layer laminate has at least one layer, preferably its outermost and lowermost layers, more preferably one or more middle layers, too, formed of the resin composition, so as to develop additional features other than those given by the resin composition. The kind of another resin and the thickness of each individual layer in the laminate may be so selected depending on the intended use of the resinous window, mirror, lamp reflector, cover, case or part.

According to a fifth embodiment of the present invention, there is provided an integrally-molded article having a hollow structure in communication with the open air and/or a closed hollow structure, and comprising the resin composition. Such a hollow, integrally-molded article advantageously benefits from the properties of the resin composition, such as high rigidity, heat resistance and dimensional stability after heating/molding, and can be therefore applied to interior and exterior parts and outer panels of an automotive vehicle (such as a door, a roof and a hood).

Many interior and exterior parts and outer panels of an automotive vehicle have a hollow structure defined by steel plates and resin panels to accommodate therein an auxiliary device, etc. For example, a side or back door is formed by defining a hollow structure with outer and inner steel plates, attaching a resin panel to the inner steel plate in the process of assembling after painting, and installing an auxiliary devices or devices in the hollow structure. A roof, hood, trunk lid, or back door is formed by providing an outer steel plate and a steel reinforcement and attaching a resinous part to its inside after painting. These parts and panels are relatively large in size, and require high rigidity and dimensional stability. It has been difficult to form an integral combination of such structural panels and/or plates from any conventional resinous material. However, the resin composition has high rigidity, low thermal expansibility and low thermal contractibility so that the hollow, integrally-molded article formed from the resin composition can be of integral (one-piece) type. This makes it possible to reduce the number and weight of parts in the vehicle as well as the number of steps in vehicle assembling process.

The above hollow, integrally-molded article can be formed from the resin composition alone, or a multi-layer laminate comprising the resin composition and another resin. The multi-layer laminate has at least one layer, preferably its outermost and lowermost layers, more preferably one or more middle layers, too, formed of the resin composition, so as to develop additional features other than those given by the resin composition. The thickness of each individual layer in the laminate and the kind of any resin used in combination with the resin composition may be selected depending on the intended use of the integrally-molded article.

Further, the hollow, integrally-molded article can be provided with an outermost layer of a decorative material (such as a skin material or a material of printed design) in order to improve design, feel and quality and promote commercialization of the integrally-molded article. For example, the integrally-molded article can be provided with an outermost layer of a skin layer such as a napped, embossed, laser-patterned or woodgrain-finished sheet when used for the inner portion of a roof, a pillar garnish, or an instrument panel. When the integrally-molded article is formed from the above-mentioned multi-layer laminate, an intermediate layer of the laminate may be formed with printed design. In such a case, the integrally-molded article presents a lustrous or deep appearance by providing transparency in its outermost layer.

In order to attain improved heat-insulating and sound-proofing properties, the hollow structure of the integrally-molded articles can be filled with a gas, liquid or solid, or a mixture thereof and then sealed. The filling material is not particularly restricted and can be any known material. When transparency is required, a gas, such as nitrogen, argon, carbon dioxide or air, is preferably used. When transparency is not required, it is preferable to use any gas as mentioned above, or paraffin or wax that is liquefied at an elevated temperature during the filling and thereafter solidified at a normal temperature. The use of such a filling material can create a comfortable environment in the automotive vehicle by restraining the escape of cool air from the vehicle and the infiltration of heat from outside in summer, and restrains the escape of warm air and the infiltration of cold air in winter. Also, the integrally-molded article, which is double walled with the hollow space filled with any filling material, can absorb the energy of noise from outside and ensure a calm environment in the vehicle. It is thus possible to reduce any radiant noise and heat coming out from the engine compartment by applying such an integrally-molded article to e.g. a hood.

The method of forming the hollow, integrally-molded article is not particularly limited, and can be any known process, such as common vacuum and pressure forming, injection molding, blow molding, or press forming. The hollow, integrally-molded article can be formed by either of the following processes without process steps being increased undesiredly.

In one process, two resin sheets formed from the resin composition are fixed in a holder with a pressurized fluid introduction path. The holder is sealed by a known method to form a closed space between the two resin sheets. The sheets are heated to at least their deflection temperature under load and set in a mold in an open state, and then, the softened sheets are welded together along their outer peripheral sections pressed together by the mold. Before, during or after the welding (preferably before or after the welding), a pressurized fluid is introduced into the closed space between the two resin sheets to expand the resin sheets. A pressure of the fluid is maintained by closing the mold during or after the expansion of the resin sheets, until the thus-molded particle is cooled to form a hollow structure. It is preferable to use a mold having an evacuating hole to evacuate, at the time of the expansion of the resin sheets, a space between a mold surface and each resin sheet and then bring them into intimate contact with each other. Such evacuation provides improved transferability in the integrally-molded article.

In another process, the resin composition is melted and filled into the cavity of a mold in a closed state. During or after the filling of the molt resin composition, the mold is retracted to have its cavity enlarged. At this time, a pressurized fluid is introduced into the molten resin composition so that the thus-molded article forms a hollow structure.

In still another process, one or two resin sheets comprising the resin composition are inserted along the cavity surfaces of a mold in an open state. The mold is closed, and then, a molten resin is fed into the mold so that a space between the two sheets or behind the one sheet is filled with the resin. During or after the filling of the molten resin, the mold is retracted to have its cavity enlarged. At this time, a pressurized fluid is introduced into the molten resin so that the thus-molded article forms a hollow structure. More specifically, one resin sheet formed from the resin composition is inserted along the cavity surface on one side of an open mold, and while a molten resin is fed to fill the cavity behind the sheet, or thereafter, a pressurized fluid is introduced into the molten resin to form a hollow structure, while the cavity volume of the mold is enlarged, or two resin sheets are inserted along the cavity surfaces on both sides of a mold, and while a molten resin is fed to fill the cavity between the sheets, a pressurized fluid is introduced into the molten resin to form a hollow structure, while the cavity volume of the mold is enlarged.

The resin fed to fill the mold cavity in the above process can be any resin that adheres closely to the sheet or sheets of the resin composition, preferably being of the same kind as the resin composition or having a solubility parameter (SP) close to that of the resin composition. Examples of such a resin include a polycarbonate resin, a styrene resin, poly-4-methylpentene-1, or thermoplastic polyurethane resin. Among these resins, especially preferred is a polycarbonate resin. Herein, the polycarbonate resin is a polymer derived from a divalent phenol compound, such as bisphenol A, and may be produced by a phosgene process, ester interchange, or solid-phase polymerization. It may not only be a known polycarbonate resin, but may also be a polycarbonate resin produced by polymerization in an ester interchange process.

The pressurized fluid used in the above processes is not particularly restricted, and can be selected from known substances in view of the composition of the resin sheets. For example, a gas (such as air or nitrogen) or a liquid (such as water or silicon oil) is preferably used as the pressurized fluid.

Figure 12A:
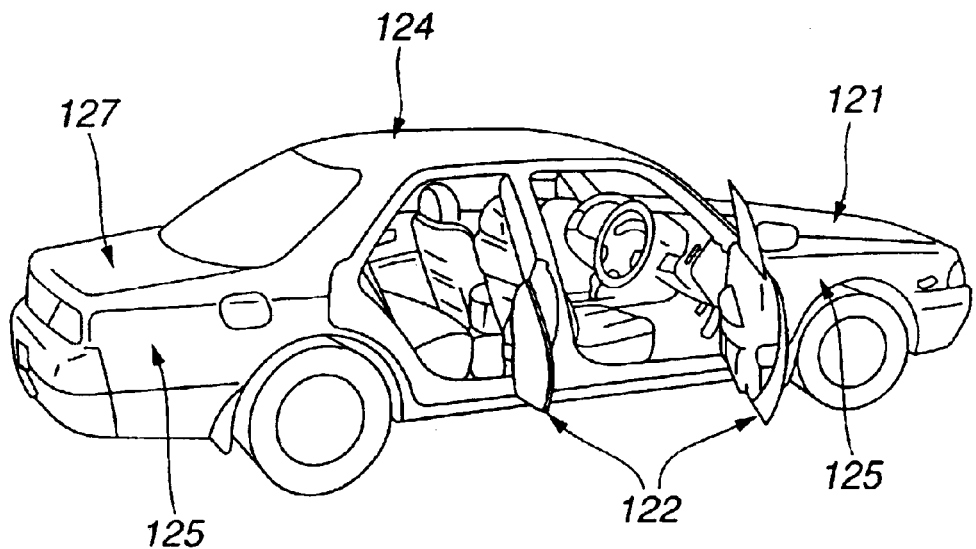
FIG. 12A is a schematic perspective view of an automotive vehicle of which exterior parts are produced using a resin composition according to the present invention.
Figure 12B:
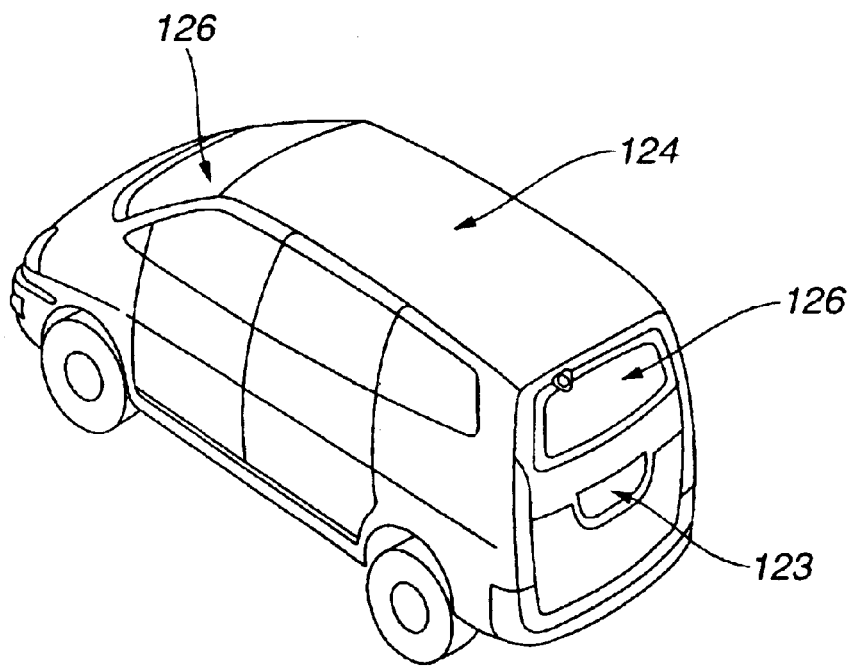
FIG. 12B is a schematic perspective view of an automotive vehicle of which exterior parts are produced using a resin composition according to the present invention.
Figure 13A:
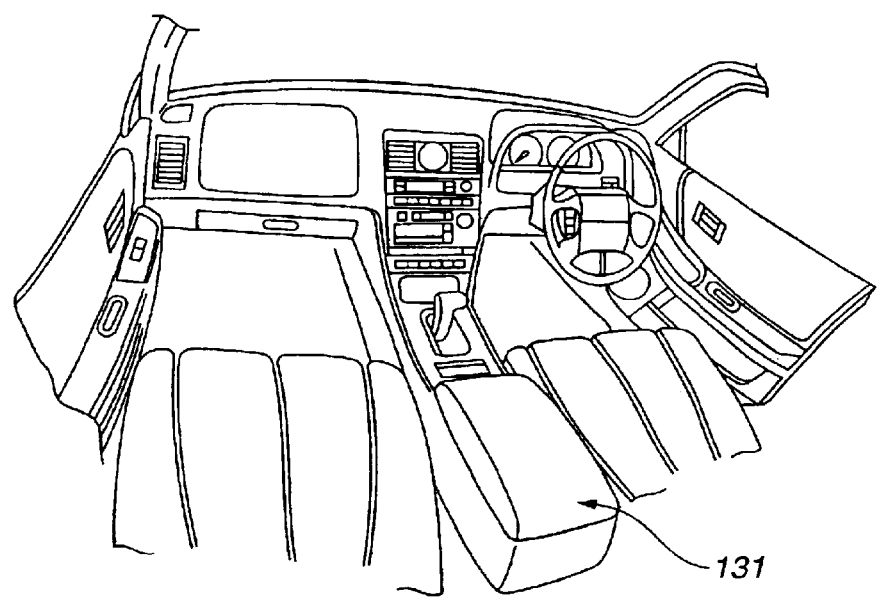
FIG. 13A is a schematic perspective view showing the inside of a passenger compartment of an automotive vehicle, which includes an interior part produced using a resin composition according to the present invention.
Figure 13B:
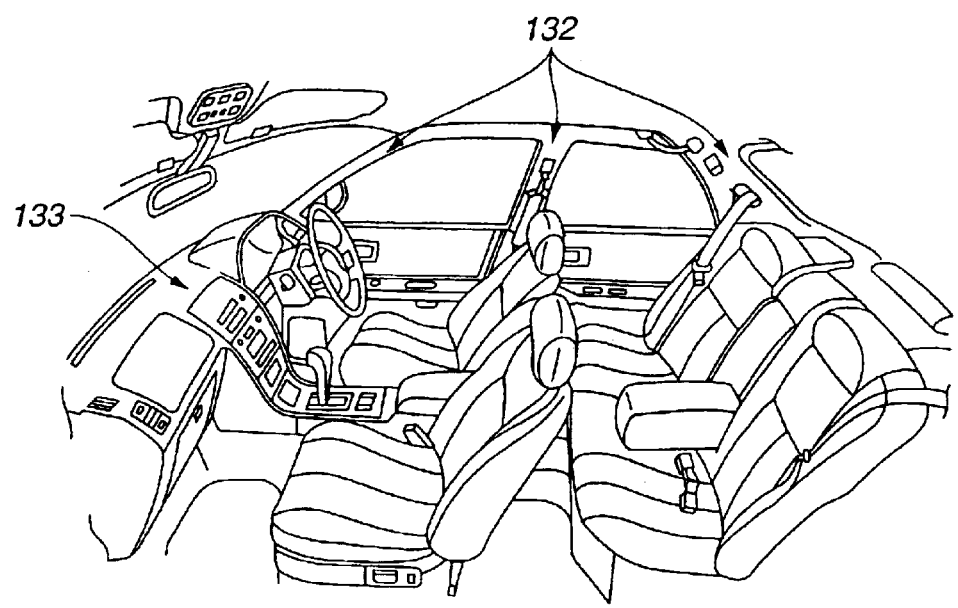
FIG. 13B is a schematic perspective view showing the inside of a passenger compartment of an automotive vehicle, which includes interior parts produced using a resin composition according to the present invention.

Example uses of the above hollow, integrally-molded article are as hood 121, door 122, back door 123, roof 124, fender 125, window 126, trunk lid 127, center console box 131, pillar garnish 132, instrument panel 133, and a head lining (not shown), as shown in FIGS. 12 and 13. Each of parts 121 to 127 and 131 to 133 can be produced by molding an inner or outer panel, an attachment and reinforcements integrally with each other in one step. It is therefore possible to reduce the number of parts in the vehicle and the number of steps in vehicle assembling process. These parts 121 to 127 and 131 to 133 can have a hollow space filled with a gas, liquid or solid, or a mixture thereof and sealed so as to develop additional functions. For example, hood 121 may have an integrated reinforcement to be provided with sound-proofing and heat-insulating functions. Roof 124 may have an integrated head lining to be provided with heat-insulating and sound-proofing functions. Each of doors 122 and 123 and fender 125 may have inner and outer panels integral with each other.

According to a sixth embodiment of the present invention, there is provided an integrally-molded part comprising the resin composition and formed into one piece by integrating originally different kinds of parts to combine therein two or more functions. Examples of the functions combined into the integrally-molded part are the function of a display as of an instrument panel, the function of ventilation as of an air conditioner duct, and the function of fixing as of a roof rail. The resin composition has a broad range of properties including high rigidity, heat resistance, dimensional stability after heating/molding and chemical resistance so that the integrally-molded part can be made multifunctional by being formed in one piece of such a resin composition. This makes it possible to produce a large part in a module or integrated form and to reduce the number and weight of parts in the vehicle and the number of steps in vehicle assembling process, while retaining high quality.

Figure 14:
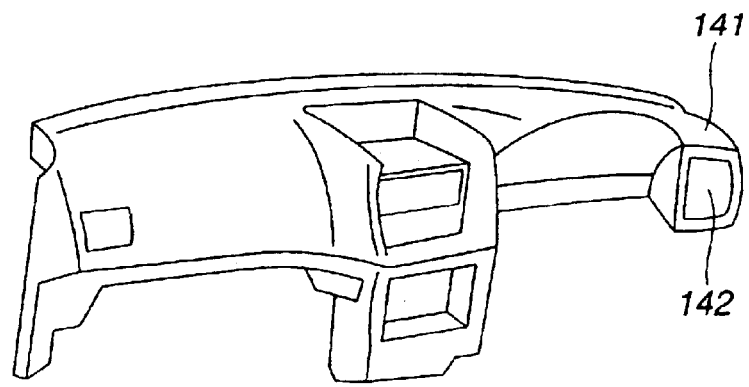
FIG. 14 is a schematic perspective view of an instrument panel for an automotive vehicle, which is produced using a resin composition according to the present invention.
Figure 15:
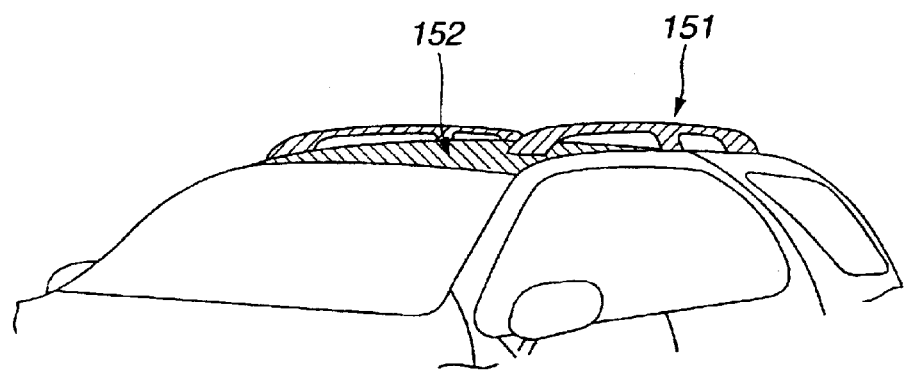
FIG. 15 is a schematic fragmentary view of an upper part of an automotive vehicle, in which a roof panel and roof rails are integrally formed from a resin composition according to the present invention.

One example of such an integrally-molded part with two or more functions is a relatively large interior part for an automotive vehicle, such as an instrument panel. It has been usual to form an instrument panel by preparing a panel portion, an air duct and case for an air conditioner and a steering cross member (generally made of steel) separately and putting them together in a manufacturing line. Any conventional resinous material cannot be formed into a large-sized, complicated-shaped integral combination part of the panel portion and the air duct and case without being caused to shrink or warp during molding and to expand under heat. However, the resin composition has high heat resistance and dimensional stability after heating/molding so that panel portion 141 and air duct and case 142 can be molded into one piece, as shown in FIG. 14. Such an instrument panel is free from the problems of shrinkage, warpage and expansion and, at the same time, is in no need of the steering cross member. The instrument panel may have an integrated resinous bracket, although it has been usual to retrofit a steel bracket to the panel. Also, the instrument panel may have a layer of a decorative material e.g. a skin material formed by insert molding. The integrally-molded part can be applied to a door with similar results. It has been practical to form the door by preparing a door inner panel (generally made of steel) and various other parts, such as a side window guide rail, a regulator, a door lock and a speaker with a housing, separately and putting them together in a manufacturing line. The use of the resin composition however allows these door inner panel, guide rail, speaker housing etc. to be molded into one piece.

Another example of the integrally-molded part with two or more functions is a relatively large exterior part for an automotive vehicle, such as an integral combination of roof rail 151 and roof panel 152. A conventional resinous roof rail presents the problems of rigidity and heat and cold resistance, although it is often placed in severe load and temperature conditions. However, roof rail 151 formed from the resin composition is free from such problems to be therefore formed integrally with roof panel 152. The integrally-molded part can be applied to a spoiler with similar results, and the spoiler and the trunk lid can be formed into one piece.

Figure 16:
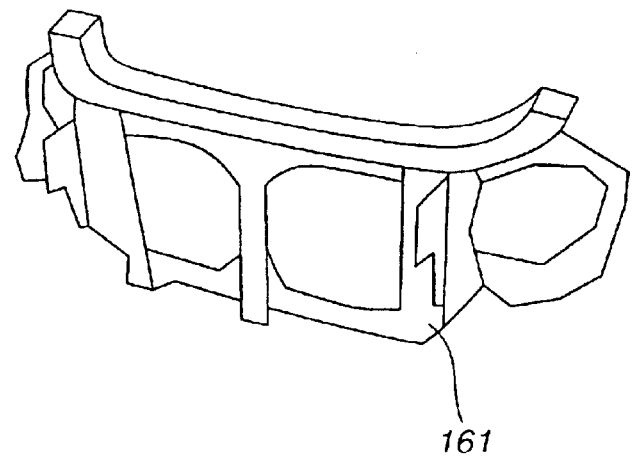
FIG. 16 is a schematic perspective view of a radiator core support for an automotive vehicle, which is produced from a resin composition according to the present invention.

Still another example of the integrally-molded part with two or more functions is a relatively large vehicle body part, such as radiator core support 161, as shown in FIG. 16. A resinous radiator core support is proceeding toward practical utilization as a front end module. The resin composition can provide higher heat resistance, chemical resistance and rigidity in radiator core support 161 while making radiator core support 161 lighter in weight. Further, radiator core support 161 can combine a fan shroud, a bracket, transparent parts, such as a radiator reservoir tank and a headlamp cover, as well as a bumper reinforcement member.

Other examples of the integrally-molded part with two or more function are parts for use in an engine compartment. Although there has been an attempt to integrate some engine compartment parts into one by the use of a resinous material, any conventional resinous material has the problem of withstanding severe conditions of high temperature, attack by chemicals (such as oil) and the like in the engine compartment. However, the use of the resin composition of the present invention provides high heat resistance and chemical resistance and low thermal expansibility in e.g. an air cleaner and a throttle chamber. The air cleaner and the throttle chamber can withstand such severe conditions and be therefore combined together and molded into one piece. The integrally-molded part can be also applied to an intake manifold and a cylinder head cover with similar results, and the intake manifold and the cylinder head cover can be combined with the air cleaner and throttle chamber.

The above integrally-molded part with two or more functions can be formed from the resin composition alone, or a multi-layer laminate comprising the resin composition and another resin. The multi-layer laminate has at least one layer, preferably its outermost and lowermost layers, more preferably one or more middle layers, too, formed of the resin composition, so as to develop additional features other than those given by the resin composition. The thickness of each individual layer in the laminate and the kind of any resin used in combination with the resin composition may be selected depending on the intended use of the integrally-molded part.

According to a seventh embodiment of the present invention, there is provided a molded part having a movable portion and an unmovable portion each comprised of the resin composition. Such a part advantageously benefits from the properties of the resin composition, such as high rigidity, heat resistance and dimensional stability after heating/molding, and can be therefore used in an intake/exhaust system and an air-conditioning unit of an automotive vehicle. The intake/exhaust system and the air-conditioning unit contain many parts having movable and unmovable portions (including a throttle chamber and a door in the air-conditioning unit), which are mainly intended for gas flow control. The movable portion and the unmovable portion perform as a lid member to be opened and closed to regulate a gas flow and a cylindrical member through which gas flows, respectively, so that a high degree of gas tightness is required between the movable and unmovable portions. A conventional resinous material is too high in molding contractibility and thermal expansibility to attain dimensional accuracy for gas tightness between the movable and unmovable portions. Further, any resinous material does not satisfy the requirement of heat resistance to be used in the engine compartment. However, the resin composition provides high heat resistance, low thermal expansibility and low molding contractibility without the above-mentioned problems, so that the above molded parts e.g. throttle valve formed from the resin composition can attain improved gas tightness between its movable and unmovable portions. The resin composition also provides high rigidity to achieve weight reduction and quick response in the parts.

There is no particular limitation on the manufacturing process of the part having movable and unmovable portions, and any known process is used. For example, the part can be manufactured by forming the movable and unmovable portions separately by injection molding and assembling them into one. It is however preferable to form the movable and unmovable portions integrally by e.g. coinjection molding, so as to achieve a higher degree of gas tightness and to reduce the number of parts and the number of steps in vehicle assembling process.

Figure 17B:
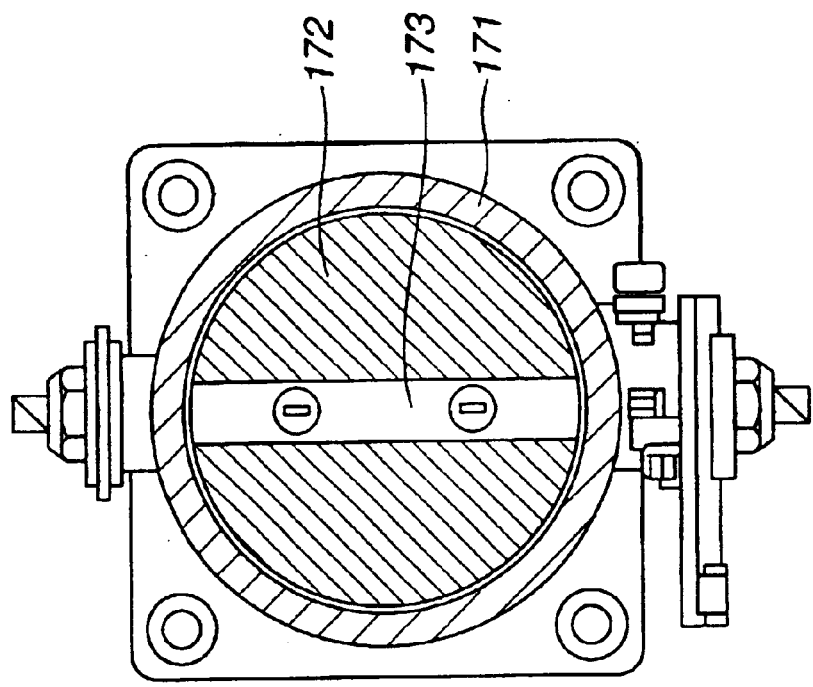
FIG. 17B is a sectional view of the valve system, when taken along an A—A line of FIG. 17A.
Figure 17A:
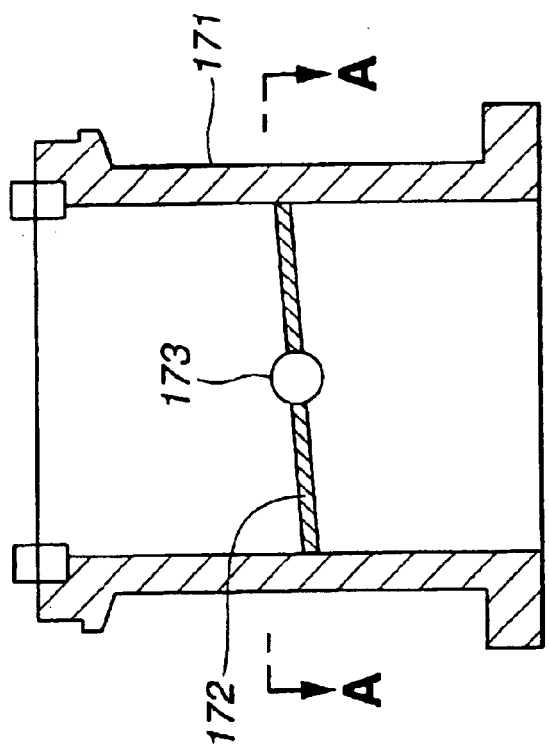
FIG. 17A is a schematic sectional view of a valve system for an automotive vehicle, in which a valve and a chamber portion are produced using a resin composition according to the present invention.

As shown in FIG. 17, for example, the throttle chamber has cylindrical chamber portion 171 (corresponding to the unmovable portion), valve 172 (corresponding to the movable portion) and metal shaft 173 for the valve 172. This throttle chamber can be manufactured by setting metal shaft 173 in a mold, forming chamber portion 171 by injection molding and then forming valve 172 by injection molding, with a slide core being retracted, in such a manner as to unite valve 172 and metal shaft 173 as a integral combination.

According to a eighth embodiment of the present invention, there is provided a part or container for holding therein any hydrocarbon fuel, such as a fuel tank or any other part of a fuel supply system in an automotive vehicle or a kerosene container for domestic use, comprising the resin composition. This part or container advantageously benefits from the properties of the resin composition, such as good hydrocarbon-fuel shutoff ability, gas barrier property and chemical resistance.

Figure 18:
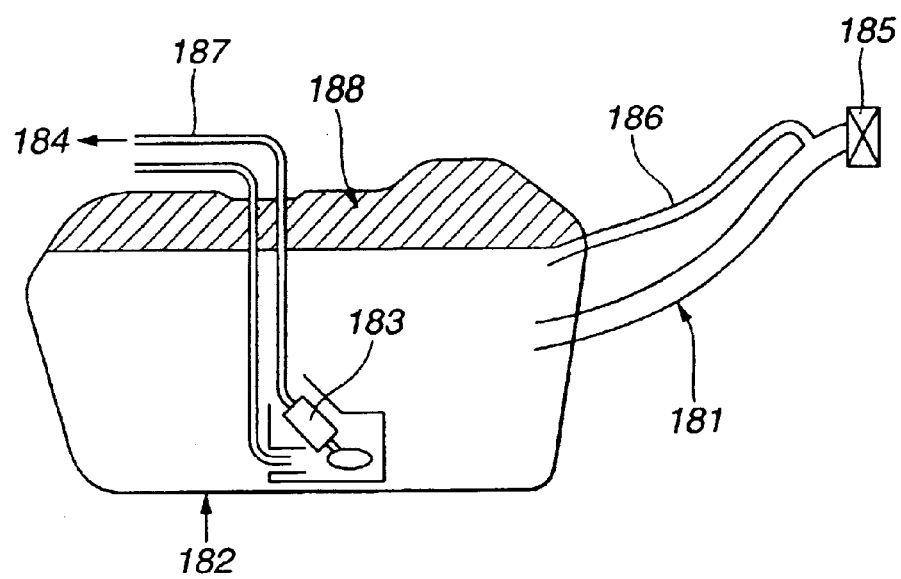
FIG. 18 is a schematic sectional view of a fuel supply system for an automotive vehicle, which includes parts produced from a resin composition according to the present invention.

Examples of the hydrocarbon-fuel holding part or container formed from the resin composition are shown in FIG. 18. In a fuel supply system of FIG. 18, gasoline (i.e. a hydrocarbon fuel) is introduced through filler tube 181 stored in fuel tank 182 and forced into engine 184 by fuel pump 183, and each of fuel tank 182, filler cap 185, vent tube 196, fuel hose, 187 and a fuel cutoff valve (not shown), a delivery valve (not shown), an evaporation tube (not shown), a return tube (not shown) and a fuel sender module (not shown) comprises the resin composition.

Herein, a fuel tank is the largest part in a fuel supply system of an automotive vehicle. Recently, there has been an increasing use of a resinous material for the fuel tank. Such a resinous tank can hold about 10 liters more fuel and be 25% lighter in weight than a metallic tank owing an increased freedom of the shapes of parts, and these advantages have brought about greater expectations for the resinous fuel tank. The following is a detailed statement of the present status of the use of a resinous material for the fuel tank and the problems involved therein.

It has been usual to use an olefin resin; HDPE (high density polyethylene) as a base material for a fuel tank and to manufacture the fuel tank by blow molding. The fuel tank has been changed in its layer structure, although not so changed in its material and manufacturing process. More specifically, the fuel tank has been changed from a single-layer type to a multi-layer type due to the enactment of the law for control of hydrocarbon-fuel evaporation. At present, the fuel tank generally has a multi-layer structure with five layers of three kinds of materials, i.e. a mixture of HDPE and PA (polyamide), a mixture of HDPE and EVOH (ethylene-vinyl acetate copolymer) and HDPE on both sides thereof. This fuel tank is formed by blow molding as usual.

The amount of hydrocarbon fuel permeating through the fuel tank is increased with the compatibility between the material of the fuel tank and the hydrocarbon fuel. More specifically, HDPE and the hydrocarbon fuel have solubility parameters (SP) of 7.9 and 6 to 8, respectively, that falls within the same range. HDPE and the hydrocarbon fuel have a good compatibility so that a large amount of the hydrocarbon fuel is allowed to permeate through the single-layer type fuel tank. PA has a SP of 13.6 that differs greatly from that of the hydrocarbon fuel. PA and the hydrocarbon fuel are low in compatibility so that PA of the multi-layer type fuel tank functions as a barrier layer to prevent the hydrocarbon fuel from permeating through the tank.

The multi-layer type fuel tank is compliant with the law for control of hydrocarbon-fuel evaporation, as described above. However, the molding process of the multi-layer type fuel tank is complicated so that the tank becomes significantly high in price. In addition, the multi-layer type fuel tank is not easy to recycle owing to its multi-layer structure of the plurality of resins, and thus fails to cope with the current social requirement of recycling.

On the other hand, the metal oxide of the resin composition has hydroxyl groups e.g. silanol groups remaining at its surface to show a SP exceeding 11, thereby capable of acting as a barrier against the permeation of the hydrocarbon fuel as with PA or EVOH. Further, the polymer of the resin composition preferably contains polar groups, such as acrylics, to show a SP of 11 or more. In other words, the resin composition has a low compatibility with the hydrocarbon fuel e.g. gasoline, and can be used as a suitable raw material for the fuel tank. The fuel tank formed from the resin composition becomes compliant with the law for control of hydrocarbon-fuel evaporation, even if it is of single-layer type. It is therefore possible to produce the fuel tank at a low cost and to satisfy the social requirement of recycling. Herein, the resin composition can be formed into the fuel tank by blow molding as usual, regardless of whether the tank is of single-layer or multi-layer type.

The part or container formed from the resin composition is also applicable for domestic use as described above, although it may be less effective than used as the vehicle fuel tank. With the kerosene container being formed from the resin composition, for example, it is possible to reduce the evaporation of kerosene into the air and to contribute to the preservation of global environment.

As described above, the parts and articles formed using the resin composition can be colored in a desired tone by e.g. mixing a coloring material into the resin composition or interposing a coloring layer. Such parts and articles are suited not only for use in an automotive vehicle but also for e.g. exterior and interior components of a building and interior parts of a rail car where appearance qualities (e.g. visual beauty, smoothness and transparency).

The method of forming the above parts and articles using the resin composition is selected from injection molding, extrusion molding, compression molding, vacuum molding etc. depending upon the intended use of the particles and articles, as described above.

The present invention will be described in more detail by reference to the following examples. However, it should be noted that the following examples are only illustrative and not intended to limit the invention thereto.

In the following description, all parts are by mass unless otherwise specified.

Preparation of Test Samples

A test sample was prepared by drying a resin composition or material, forming the dried resin composition or material by hot press under the conditions of a temperature of 170° C., a pressure of 20 kg/cm$^2$ and a press time of 5 minutes, so that each test sample had a length of 70 mm, a width of 10 mm and a thickness of 0.5 to 1 mm.

Evaluation of Test Samples (1) Total Light Transmittance

The total light transmittance of each test sample was measured by a Haze meter "HM-65" available from Murakami Color Research Institute.

(2) Dispersion Degree of Silica

The dispersion degree of silica was measured as follows. The test sample was cut in a thickness direction thereof, and a cut face of the test sample was photographed by a transmission electron microscope "H-800" available from Hitachi, Ltd. with 8,000 magnifications. In the taken photograph, an islands-in-a-sea structure of the resin composition was seen under magnification to determine an average size of islands (derived from silica particles and/or aggregates thereof) in the sea-island structure. Then, the silica dispersion degree was rated as A (very good) when the average island size was 200 nm or less, B (good) when the average island size was larger than 200 nm and equal to and smaller than 380 nm, and C (not good) when the average island size was larger than 380 nm.

(3) Rockwell Hardness

The Rockwell hardness of each test sample was measured by a Rockwell hardness meter (M scale).

(4) Bending Strength and Modulus

The bending strength and modulus of each test sample was measured by an Autograph "DCS-10T" available from Shimadzu Corporation.

(5) Coefficient of Linear Expansion

The coefficient of linear expansion of each test sample was measured by a thermomechanical measurement device "TMA120C" available from Seiko Instruments Inc.

EXAMPLE 1

A monomer solution containing 0.7 mol/l of methyl methacrylate and 0.3 mol/l of acrylic acid in methyl ethyl ketone was prepared. Then, 0.5 mol % of azobisisobutyronitrile (hereinafter abbreviated to AIBN, used as a polymerization initiator) was added into the monomer solution. The thus-obtained solution was heated to 80° C.

In the meantime, silica particles were treated with 3-aminopropyltrimethoxysilane (as a surface modifier) to modify 15 to 50% of surface hydroxyl groups in most of the silica particles. The silica particles used were "Snowtex OUP" available Nissan Chemical Industries. Ltd. in the form of chain-shaped secondary particles (having a diameter of 5 to 10 nm and a length of 90 to 350 nm) of fine silica particles (having a diameter of 5 to 10 nm and a length of 7 to 50 nm). The surface-modified silica particles were dispersed in methyl ethyl ketone.

While the dispersion of the surface-modified silica particles was gradually added to the monomer solution, the methyl methacrylate and acrylic acid were allowed to react with each other for 6 hours to form a resin composition at a 30-to-70 silica-to-polymer mass ratio. After the completion of reaction, hexane was added to the solution to yield the resin composition upon coagulation.

A test sample was prepared from the resin composition and evaluated in terms of total light transmittance, silica dispersion degree, Rockwell hardness, bending strength and modulus and coefficient of linear expansion by the above-described methods. The evaluation results are shown in TABLE.

The resin composition of Example 1 had not only good transparency but also higher surface hardness bending strength and bending modulus and a lower coefficient of linear expansion than those of Comparative Example 1 (using silica particle without surface modification as will be described later), Comparative Example 2 (using silica particles surface treated with alkyls as will be described below) and Comparative Example 3 (using an acrylic resin alone, i.e. without silica particles, as will be described later).

EXAMPLE 2

A monomer solution containing 0.7 mol/l of methyl methacrylate and 0.3 mol/l of styrenesulfonic acid in methyl ethyl ketone was prepared. Then, 0.5 mol % of AIBN (as a polymerization initiator) was added to the monomer solution. The thus-obtained solution was heated to 80° C.

In the meantime, silica particles were treated with N-2-(aminoethyl)-3-aminopropyltrimethoxysilane (as a surface modifier) in such a manner as to modify 15 to 50% of surface hydroxyl groups in most of the silica particles. The silica particles used were "Snowtex OUP" available from Nissan Chemical Industries. Ltd. in the form of network-shaped secondary particles (having a diameter of 5 to 10 nm and a length of 90 to 350 nm) of fine silica particles (having a diameter of 5 to 10 nm and a length of 7 to 50 nm). The surface-modified silica particles were dispersed in methyl ethyl ketone.

While the dispersion of the surface-modified silica particles was gradually added to the heated monomer solution, the methyl methacrylate and styrenesulfonic acid were allowed to react with each other for 6 hours to form a resin composition at a 30-to-70 silica-to-polymer mass ratio. After the completion of reaction, hexane was added to the solution to yield the resin composition upon coagulation.

A test sample was prepared from the resin composition and evaluated in terms of total light transmittance, silica dispersion degree, Rockwell hardness, bending strength and modulus and coefficient of linear expansion by the above-described methods. The evaluation results are shown in TABLE.

The resin composition of Example 2 had not only good transparency but also higher surface hardness, bending strength and bending modulus and a lower coefficient of linear expansion than those of Comparative Examples 1 to 3. Favorably, the resin composition of Example 1 had a lower coefficient of linear expansion than that of Example 1.

EXAMPLE 3

A monomer solution containing 0.7 mol/l of methyl methacrylate and 0.3 mol/l of acrylic acid in methyl ethyl ketone was prepared. Then, 0.5 mol % of AIBN (as a polymerization initiator) to was added the monomer solution. The thus-obtained solution was heated to 80° C.

In the meantime, silica particles were treated with 3-aminopropyltriethoxysilane (as a surface modifier) in such a manner as to modify 15 to 50% of surface hydroxyl groups in most of the silica particles. The silica particles used were "Snowtex OUP" available from Nissan Chemical Industries. Ltd. in the form of chain-shaped secondary particles (having a diameter of 5 to 10 nm and a length of 30 to 80 nm) of fine silica particles (having a diameter of 5 to 10 nm and a length of 7 to 50 nm). The surface-modified silica particles were dispersed in methyl ethyl ketone.

While the dispersion of the surface-modified silica particles was gradually added to the heated monomer solution, the methyl methacrylate and acrylic acid were allowed to react with each other for 6 hours to form a resin composition at a 30-to-70 silica-to-polymer mass ratio. After the completion of reaction, hexane was added to the solution to yield the resin composition upon coagulation.

A test sample was prepared from the resin composition and evaluated in terms of total light transmittance, silica dispersion degree, Rockwell hardness, bending strength and modulus and coefficient of linear expansion by the above-described methods. The evaluation results are shown in TABLE.

The resin composition of Example 3 had not only good transparency but also higher surface hardness, bending strength and bending modulus and a lower coefficient of linear expansion than those of Comparative Examples 1 to 3. However, the resin composition of Example 3 was slightly lower in bending strength, because of its shorter particle length, than that of Example 1.

EXAMPLE 4

A monomer solution containing 0.7 mol/l of methyl methacrylate and 0.3 mol/l of acrylic acid in methyl ethyl ketone was prepared. Then, 0.5 mol % of AIBN (as a polymerization initiator) was added to the monomer solution. The thus-obtained solution was heated to 80° C.

In the meantime, silica particles were treated with 3-aminopropyltriethoxysilane (as a surface modifier) in such a manner as to modify 15 to 50% of surface hydroxyl groups in most of the silica particles. The silica particles used were "Snowtex OUP" available from Nissan Chemical Industries. Ltd. in the form of chain-shaped secondary particles (having a diameter of 5 to 10 nm and a length of 350 to 500 nm) of fine silica particles (having a diameter of 5 to 10 nm and a length of 7 to 50 nm). The surface-modified silica particles were dispersed in methyl ethyl ketone.

While the dispersion of the surface-modified silica particles were added to the heated monomer solution, the methyl methacrylate and acrylic acid were allowed to react with each other for 6 hours to form a resin composition at a 30-to-70 silica-to-polymer mass ratio. After the completion of reaction, hexane was added to the solution to yield the resin composition upon coagulation.

A test sample was prepared from the resin composition and evaluated in terms of total light transmittance, silica dispersion degree, Rockwell hardness, bending strength and modulus and coefficient of linear expansion by the above-described methods. The evaluation results are shown in TABLE.

The resin composition of Example 4 had not only good transparency but also higher bending strength and modulus and a lower coefficient of linear expansion than those of Comparative Example 1 to 3. Favorably, the resin composition of Example 4 was higher in bending strength than that of Example 1. However, the resin composition of Example 4 had a longer silica particle length than the wavelength of visible light and was thereby lower in transparency and surface hardness than that of Example 1.

EXAMPLE 5

A monomer solution containing 0.7 mol/l of methyl methacrylate and 0.3 mol/l of acrylic acid in methyl ethyl ketone was prepared. Then, 0.5 mol % of AIBN (as a polymerization initiator) was added to the monomer solution. The thus-obtained solution was heated to 80° C.

While the dispersion of surface-modified silica particles in methyl ethyl ketone was gradually added in the heated monomer solution, the methyl methacrylate and acrylic acid were allowed to react with each other for 6 hours to form a resin composition at a 10-to-90 silica-to-polymer mass ratio. Herein, the surface-modified silica particles used were the same as used in Example 1. After the completion of reaction, hexane was added to the solution to yield the resin composition upon coagulation.

A test sample was prepared from the resin composition and evaluated in terms of total light transmittance, silica dispersion degree, Rockwell hardness, bending strength and modulus and coefficient of linear expansion by the above-described methods. The evaluation results are shown in TABLE.

The resin composition of Example 5 had not only good transparency but also higher surface hardness and bending modulus and a lower coefficient of linear expansion than that of Reference Example 3. However, the resin composition of Example 5 was lower in surface hardness and bending strength and modulus and higher in coefficient of linear expansion, because of its smaller silica content, than that of Example 1.

EXAMPLE 6

A monomer solution containing 0.7 mol/l of methyl methacrylate and 0.3 mol/l of acrylic acid in methyl ethyl ketone was prepared. Then, 0.5 mol % of AIBN (as a polymerization initiator) was added to the monomer solution. The thus-obtained solution was heated to 80° C.

While the dispersion of surface-modified silica particles in methyl ethyl ketone was gradually added to the heated monomer solution, the methyl methacrylate and acrylic acid were allowed to react with each other for 6 hours to form a resin composition at a 70-to-30 silica-to-polymer mass ratio. The surface-modified silica particles used were the same as used in Example 1. After the completion of reaction, hexane was added to the solution to yield the resin composition upon coagulation.

A test sample was prepared from the resin composition and evaluated in terms of total light transmittance, silica dispersion degree, Rockwell hardness, bending strength and modulus and coefficient of linear expansion by the above-described methods. The evaluation results are shown in TABLE.

The resin composition of Example 6 had not only good transparency but also higher surface hardness and bending modulus and a lower coefficient of linear expansion than those of Comparative Example 3. Favorably, the resin composition of Example 6 was higher in bending modulus than that of Example 1. However, the resin composition of Example 6 was lower in transparency and bending strength, because of its larger silica content, than that of Example 1. When the silica content is too large, the silica particles grew in aggregation with defects formed in the silica aggregates. It is thought that the resin composition of Example 6 was deteriorated in bending strength owing to such defects.

COMPARATIVE EXAMPLE 1

A monomer solution containing 0.7 mol/l of methyl methacrylate and 0.3 mol/l of acrylic acid in methyl ethyl ketone was prepared. Then, 0.5 mol % of AIBN (as a polymerization initiator) was added to the monomer solution. The thus-obtained solution was heated to 80° C.

While the dispersion of surface-modified silica particles in an aqueous alcohol solution was gradually added to the heated monomer solution, the methyl methacrylate and acrylic acid were allowed to react with each other for 6 hours to form a resin material at a 30-to-70 silica-to-polymer mass ratio. The surface-modified silica particles used were the same as used in Example 1. After the completion of reaction, hexane was added to the solution to yield the resin material upon coagulation.

A test sample was prepared from the resin material and evaluated in terms of total light transmittance, silica dispersion degree, Rockwell hardness, bending strength and modulus and coefficient of linear expansion by the above-described methods. The evaluation results are shown in TABLE.

The resin material of Comparative Example 1 had higher surface hardness and bending strength and modulus and a lower coefficient of linear expansion than those of Comparative Example 3, but had lower surface hardness and bending strength and modulus than those of Examples 1 and 2. Further, the resin material of Comparative Example 1 was lower in transparency than Examples 1 to 6 and Comparative Example 2. It is thought that the transparency of the resin material of Comparative Example 1 was lowered owing to its larger aggregates of the silica particles.

COMPARATIVE EXAMPLE 2

A solution was prepared by dissolving 100 parts by mass of polymethyl methacrylate into 100 parts by mass of methyl ethyl ketone.

In the meantime, silica particles were treated with trimethylsilane (as a surface modifier) in such a manner as to modify 15 to 50% of surface hydroxyl groups of the silica particles to form alkyl groups. The silica particles used were the same as used in Example 1. The surface-modified silica particles were dispersed in methyl ethyl ketone in an amount of 30% by mass.

The dispersion of the surface-modified silica particles was gradually added to the solution to form a resin material at a 30-to-70 silica-to-polymer mass ratio. After that, hexane was added to the solution to yield the resin material upon coagulation.

A test sample was prepared from the resin material and evaluated in terms of total light transmittance, silica dispersion degree, Rockwell hardness, bending strength and modulus and coefficient of linear expansion by the above-described methods. The evaluation results are shown in TABLE.

The resin material of Comparative Example 2 had higher surface strength and bending strength and modulus and a lower coefficient of linear expansion than those of Comparative Example 3, although it was lower in transparency. However, the resin material of Comparative Example 2 was lower in transparency, surface hardness and bending methacrylate to react for an hour. After the completion of reaction, ethanol was added to the solution to yield an acrylic resin upon coagulation.

A test sample was prepared from the acrylic resin and evaluated in terms of total light transmittance, silica dispersion degree, Rockwell hardness, bending strength and modulus and coefficient of linear expansion by the above-described methods. The evaluation results are shown in TABLE.

TABLE

| Resin composition/material | Example 1 | Example 2 | Example 3 | Example 4 | Example 5 | Example 6 |
|---|---|---|---|---|---|---|
| Polymerization method | Batch process | Batch process | Batch process | Batch process | Batch process | Batch process |
| Monomer(s) | MMA/AA | MMA/SSA | MMA/AA | MMA/AA | MMA/AA | MMA/AA |
| Silica | | | | | | |
| Particle diameter (nm) | 5–10 | 5–10 | 5–10 | 5–10 | 5–10 | 5–10 |
| Particle length (nm) | 90–350 | 90–350 | 30–80 | 350–500 | 90–350 | 90–350 |
| Particle shape | Chain | Network | Chain | Chain | Chain | Chain |
| Functional group | Amino group | Amino group | Amino group | Amino group | Amino group | Amino group |
| Content (%) | 30 | 30 | 30 | 30 | 10 | 70 |
| Total light transmittance (%) | 92 | 92 | 92 | 84 | 92 | 85 |
| Dispersion degree of silica | A | A | A | B | A | C |
| Rockwell hardness (M scale) | 115 | 115 | 115 | 105 | 105 | 120 |
| Bending strength (MPa) | 125 | 125 | 120 | 135 | 115 | 100 |
| Bending modulus (GPa) | 4.4 | 4.4 | 4.4 | 4.4 | 3.6 | 4.5 |
| Coefficient of linear expansion (1/° C.) | $4.5 \times 10^{-5}$ | $4.3 \times 10^{-5}$ | $4.5 \times 10^{-5}$ | $4.5 \times 10^{-5}$ | $4.8 \times 10^{-5}$ | $4.5 \times 10^{-5}$ |

| Resin composition/material | Comparative Example 1 | Comparative Example 2 | Comparative Example 3 |
|---|---|---|---|
| Polymerization method | Batch process | Batch process | Batch process |
| Monomer(s) | MMA/AA | MMA | PMMA |
| Silica | | | |
| Particle diameter (nm) | 5–10 | 5–10 | — |
| Particle length (nm) | 90–350 | 90–350 | — |
| Particle shape | Chain | Chain | — |
| Functional group | Hydroxyl group | Alkyl group | — |
| Content (%) | 30 | 30 | — |
| Total light transmittance (%) | 80 | 85 | 93 |
| Dispersion degree of silica | C | C | — |
| Rockwell hardness (M scale) | 110 | 105 | 100 |
| Bending strength (MPa) | 110 | 115 | 110 |
| Bending modulus (GPa) | 3.5 | 4.3 | 3.1 |
| Coefficient of linear expansion (1/° C.) | $4.6 \times 10^{-5}$ | $4.5 \times 10^{-5}$ | $6 \times 10^{-5}$ |

MMA: Methyl methacrylate
AA: Acrylic acid
SSA: Styrenesulfonic acid
PMMA: Polymethyl methacrylate strength and modulus, because of lower degree of silica dispersion, than those of Examples 1 to 6. It is concluded that, in the resin material of Comparative Example 2, alkyl-treated (i.e. hydrophobized) silica particles were dispersed in poly(methyl methacrylate) without any chemical bonds formed therebetween, according to the silica dispersion degree measured by transmission electron microscope etc.

COMPARATIVE EXAMPLE 3

A monomer solution was prepared by mixing 100 parts by mass of methyl methacrylate into 0.5 parts by mass of benzoyl peroxide and heated to 90° C. to allow the methyl The entire contents of Japanese Patent Application No. 2002-096070 (filed on Mar. 29, 2002) and No. 2002-220236 (filed on Jul. 29, 2002) are herein incorporated by reference.

Although the present invention has been described with reference to specific embodiments of the invention, the invention is not limited to the above-described embodiments. Various modification and variation of the embodiments described above will occur to those skilled in the art in light of the above teaching. The scope of the invention is defined with reference to the following claims.

What is claimed is:
1. A resin composition, comprising:
   a polymer having functional groups; and
   a metal oxide surface modified to form functional groups at a surface of the metal oxide and dispersed uniformly in the polymer, the functional groups of the polymer and the functional groups of the metal oxide being ionically bondable to the metal oxide and the polymer, respectively, to bond the polymer and the metal oxide by ionic bonds to each other.

2. The resin composition according to claim 1, the polymer being an acrylic copolymer of at least one unsaturated monomer and a (meth)acrylic monomer copolymerizable with said at least one unsaturated monomer, said at least one unsaturated monomer having a functional group ionically bondable to an amino group, the metal oxide having hydroxyl groups and amino groups at the surface of the metal oxide.

3. The resin composition according to claim 2, wherein the metal oxide is a silica compound having silanol groups and amino groups at a surface of the silica compound.

4. The resin composition according to claim 3, wherein the functional group of said at least one unsaturated monomer is ionically bonded to the amino group of the silica compound.

5. The resin composition according to claim 3, wherein the functional group of said at least one unsaturated monomer is a carboxyl group and/or a sulfonic acid group.

6. The resin composition according to claim 2, wherein the acrylic copolymer predominantly contains an acrylic resin moiety derived from the (meth)acrylic monomer.

7. The resin composition according to claim 2, wherein said at least one unsaturated monomer is contained in an amount of 30% by mass or less based on a total mass of the acrylic copolymer.

8. The resin composition according to claim 3, the silica compound having a part of surface silanol groups treated with a surface modifier to form amino groups at the surface of the silica compound, the surface modifier having an amino group and a functional group reactable with a silanol group.

9. The resin composition according to claim 8, wherein the functional group of the surface modifier reactable with the silanol group is either one of a chloro group, a methoxy group and an ethoxy group.

10. The resin composition according to claim 3, wherein the silica compound is contained in an amount of 0.1 to 50% by mass based on a total mass of the resin composition.

11. The resin composition according to claim 3, the silica compound is at least one of primary silica particles and secondary particles each consisting essentially of a plurality of primary silica particles chemically bonded together in chain and/or network form.

12. The resin composition according to claim 11, wherein the secondary silica particles have a length of 380 nm or less.

13. The resin composition according to claim 11, wherein the primary silica particles have an average size of 5 to 50 nm.

14. A process for producing a resin composition, comprising:

preparing a solution of a monomer component, the monomer component including at least one unsaturated monomer that has a functional group;

mixing a metal oxide into the solution before or during polymerization, the metal oxide having functional groups at a surface thereof, the functional group of said at least one unsaturated monomer and the functional groups of the metal oxide being ionically bondable to each other; and polymerizing the monomer component.

15. The process according to claim 14, wherein the monomer component includes at least one unsaturated monomer having a functional group ionically bondable to an amino group and a (meth)acrylic monomer copolymerizable with said at least one unsaturated monomer, and the metal oxide is a silica compound having silanol groups and amino and/or amino alkyl groups at a surface of the silica compound.

16. The process according to claim 14, wherein the metal oxide is added into the solution directly or in a state of being dispersed in a dispersion medium.

17. An interior or exterior part, or outer panel of a vehicle, comprising the resin composition of claim 1.

18. A resinous wiper system comprising the resin composition of claim 1.

19. A resinous door mirror stay comprising the resin composition of claim 1.

20. A resinous pillar comprising the resin composition of claim 1.

21. A molded article having a transparent portion and an opaque portion, at least the transparent portion comprising the resin composition of claim 1.

22. The molded article according to claim 21, wherein the transparent portion and the opaque portion are formed integrally with each other.

23. The molded article according to claim 21, wherein the opaque portion is colored with a pigment dispersed in a resin forming the opaque portion.

24. The molded article according to claim 21, wherein the opaque portion is colored by printing or painting.

25. The molded article according to claim 21, wherein the opaque portion is formed and colored with a colored sheet.

26. A resinous window with a heating element, comprising the resin composition of claim 1.

27. A resinous mirror comprising the resin composition of claim 1.

28. A resinous lamp reflector comprising the resin composition of claim 1.

29. A resinous cover or case for use in an engine compartment, comprising the resin composition of claim 1.

30. The resinous cover or case according to claim 29, wherein the cover or case is transparent.

31. A resinous part of a cooling system, comprising the resin composition of claim 1.

32. A integrally-molded article having at least one of a hollow structure in communication with open air or a closed hollow structure, which comprises the resin composition of claim 1.

33. The integrally-molded article according to claim 32, wherein the hollow structure is filled with at least one selected from the group consisting of gas, liquid, solid and a mixture thereof and is sealed.

34. The integrally-molded article according to claim 32, comprising an outermost layer made of a decorative material.

35. The integrally-molded article according to claim 32, wherein the article is an outer panel, an interior part or an exterior part of an automotive vehicle.

36. A process for producing the integrally-molded article of claim 32, comprising:

heating first and second resin sheets each comprising said resin composition;

inserting the heated first and second resin sheets into a mold;

welding outer peripheral sections of the first and second resin sheets;

before or after said welding, introducing a pressurized fluid into between the first and second resin sheets to expand the first and second resin sheets to expand the first and second resin sheets; and closing the mold, while or after expanding the first and second resin sheet, to keep the pressurized fluid between the first and second resin sheets and thereby form a hollow structure.

37. A process for producing the integrally-molded article of claim 32, comprising:

filling said resin composition in a molten state into a mold; and during or after said filling, introducing a pressurized fluid into the resin composition to enlarge a cavity volume of the mold and thereby form a hollow structure.

38. A process for producing the integrally-molded article of claim 32, comprising:

putting one or two resin sheets comprising said resin composition of onto a cavity surface of a mold;

filling a molten resin into a location behind the one resin sheet or into a location between the two resin sheets in the mold; and during or after said filling, introducing a pressurized fluid into the resin to enlarge a cavity volume the mold and thereby form a hollow structure.

39. An integrally-molded part comprising the resin composition of claim 1, the part being formed into one piece by integrating originally different kinds of parts to combine two or more functions.

40. A molded part having a movable portion and an unmovable portion, each of the movable and unmovable portions comprising the resin composition of claim 1.

41. The molded article according to claim 40, wherein the movable and unmovable portions are formed into one piece by coinjection molding.

42. The molded part according to claim 40, wherein the movable portion is a lid member to be opened and closed for gas flow control, and the unmovable portion is a cylindrical member through which gas flows.

43. A part or container for holding a hydrocarbon fuel, comprising the resin composition of claim 1.

44. The part or container according to claim 43, wherein the part or container is for use in a fuel supply system of a vehicle.

45. The part or container of claim 43, wherein the part or container is a fuel tank of a vehicle.

46. The part or container of claim 45, wherein the fuel tank is formed by blow molding.

\* \* \* \* \*